US011149802B2

(12) United States Patent
Mikasa et al.

(10) Patent No.: US 11,149,802 B2
(45) Date of Patent: *Oct. 19, 2021

(54) CLUTCH UNIT FOR VEHICLE

(71) Applicants: SHIROKI CORPORATION, Fujisawa (JP); NTN CORPORATION, Osaka (JP)

(72) Inventors: Kunihiro Mikasa, Fujisawa (JP); Kyohei Sasanuma, Iwata (JP)

(73) Assignees: SHIROKI CORPORATION, Fujisawa (JP); NTN CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/059,069

(22) PCT Filed: May 29, 2019

(86) PCT No.: PCT/JP2019/021394
§ 371 (c)(1),
(2) Date: Nov. 25, 2020

(87) PCT Pub. No.: WO2019/230839
PCT Pub. Date: Dec. 5, 2019

(65) Prior Publication Data
US 2021/0207665 A1 Jul. 8, 2021

(30) Foreign Application Priority Data
May 31, 2018 (JP) .............................. JP2018-104581

(51) Int. Cl.
*F16D 41/067* (2006.01)
*B60N 2/04* (2006.01)

(52) U.S. Cl.
CPC ............. *F16D 41/067* (2013.01); *B60N 2/04* (2013.01)

(58) Field of Classification Search
CPC ...... F16D 41/067; F16D 41/08; F16D 41/086; F16D 41/10; B60N 2/04
See application file for complete search history.

(56) References Cited

U.S. PATENT DOCUMENTS

| 10,737,590 B2 * | 8/2020 | Mikasa ................. F16D 41/066 |
| 2010/0018832 A1 * | 1/2010 | Yamada ................. B60N 2/167 |
| | | 192/223.2 |
| 2018/0345826 A1 | 12/2018 | Mikasa | |

FOREIGN PATENT DOCUMENTS

JP    2011-153675 A    8/2011
JP    2015-148332 A    8/2015
(Continued)

OTHER PUBLICATIONS

International Search Report (ISR) (PCT Form PCT/ISA/210), in PCT/JP2019/021394, dated Jul. 16, 2019 and English translation.
(Continued)

*Primary Examiner* — Huan Le
(74) *Attorney, Agent, or Firm* — McGinn I.P. Law Group, PLLC.

(57) ABSTRACT

A clutch unit used for a vehicle seat includes an input side clutch is configured such that one member of the input side inner ring member and the input side outer ring member rotates with a rotation of the operation lever, and the other member of the input side inner ring member and the input side outer ring member is rotated via the input side transmission member, so that the rotation of the operation lever is transmitted to the output side clutch. A rotation suppressing member configured to urge the other member in the rotation axis direction and apply a rotational resistance force greater than a force for the co-rotating is provided so as to suppress co-rotation of the other member. A pressing force transmission portion configured to transmit a force the rotation suppressing member urges in the rotation axis
(Continued)

direction to the output side transmission member is provided.

4 Claims, 13 Drawing Sheets

(56) References Cited

FOREIGN PATENT DOCUMENTS

| JP | 2017-114472 A | 6/2017 |
| JP | 2018-059596 A | 4/2018 |

OTHER PUBLICATIONS

Written Opinion of the International Searching Authority (PCT Form PCT/ISA/237), in PCT/JP2019/021394, dated Jul. 16, 2019.

* cited by examiner

CLUTCH UNIT FOR VEHICLE

TECHNICAL FIELD

The present invention relates to a clutch unit for a vehicle.

BACKGROUND ART

As a clutch unit for a vehicle, one described in Patent Literature 1 has been known.

In this clutch unit for a vehicle, a wave washer is arranged between an input side outer ring member and a housing. By urging the input side outer ring member and the housing in a direction away from each other in an output shaft direction, the input side outer ring member is prevented from co-rotating together with a rotation of an input side inner ring member when an operation lever returns to a neutral position.

CITATION LIST

Patent Literature

Patent Literature 1: JP-A-2017-114472

SUMMARY OF INVENTION

Technical Problem

However, in the clutch unit for a vehicle described in Patent Literature 1, an output side transmission member is movably provided between an output side inner ring member and an output side outer ring member. The present inventors have found that when a vibration is applied to a clutch unit for a vehicle, there is a possibility that an output side transmission member vibrates to generate an abnormal noise.

Therefore, an object of the present invention is to provide a clutch unit for a vehicle in which abnormal noise caused by a vibration of an output side transmission member is unlikely to occur.

Solution to Problem

A clutch unit for a vehicle according to the present invention is a clutch unit used for a vehicle seat, comprising:

an operation lever rotatable around a rotation axis and capable of returning to a neutral position;

an output shaft member rotatable around the rotation axis and configured to output an operating force input on the operation lever to the vehicle seat;

an input side clutch including an input side inner ring member and an input side outer ring member which are coaxial with the rotation axis and into which the output shaft member, and an input side transmission member which is arranged between an outer peripheral surface of the input side inner ring member and an inner peripheral surface of the input side outer ring member; and an output side clutch including an output side inner ring member and an output side outer ring member which are provided coaxially with the rotation axis, an output side transmission member arranged between an outer peripheral surface of the output side inner ring member and an inner peripheral surface of the output side outer ring member, wherein the input side clutch is configured such that one member of the input side inner ring member and the input side outer ring member rotates with a rotation of the operation lever, and the other member of the input side inner ring member and the input side outer ring member is rotated via the input side transmission member, so that the rotation of the operation lever is transmitted to the output side clutch, during a driving operation of driving the operation lever from the neutral position, the rotation of the operation lever is input to the output side clutch, and during a return operation to return to the neutral position after driving the operation lever, the operation lever is returned to the neutral position while holding a rotational position of the output shaft member, the output side clutch is configured to allow a rotation of the output shaft member when the rotation of the operation lever is transmitted by the other member of the input side clutch while regulating the rotation of the output shaft member due to a force input from a vehicle seat side to the output shaft member, so as to suppress co-rotation of the other member by the one member during the return operation of the operation lever to the neutral position, a rotation suppressing member configured to urge the other member in the rotation axis direction and apply a rotational resistance force greater than a force for the co-rotating is provided, and a pressing force transmission portion configured to transmit a force the rotation suppressing member urges in the rotation axis direction to the output side transmission member is provided.

Advantageous Effects of Invention

According to the present invention, it is possible to provide the clutch unit for a vehicle in which an abnormal noise caused by the vibration of an output side transmission member is unlikely to occur.

DESCRIPTION OF EMBODIMENTS

Hereinafter, an embodiment of a clutch unit for a vehicle according to the present invention will be described with reference to the drawings.

Figure 1:
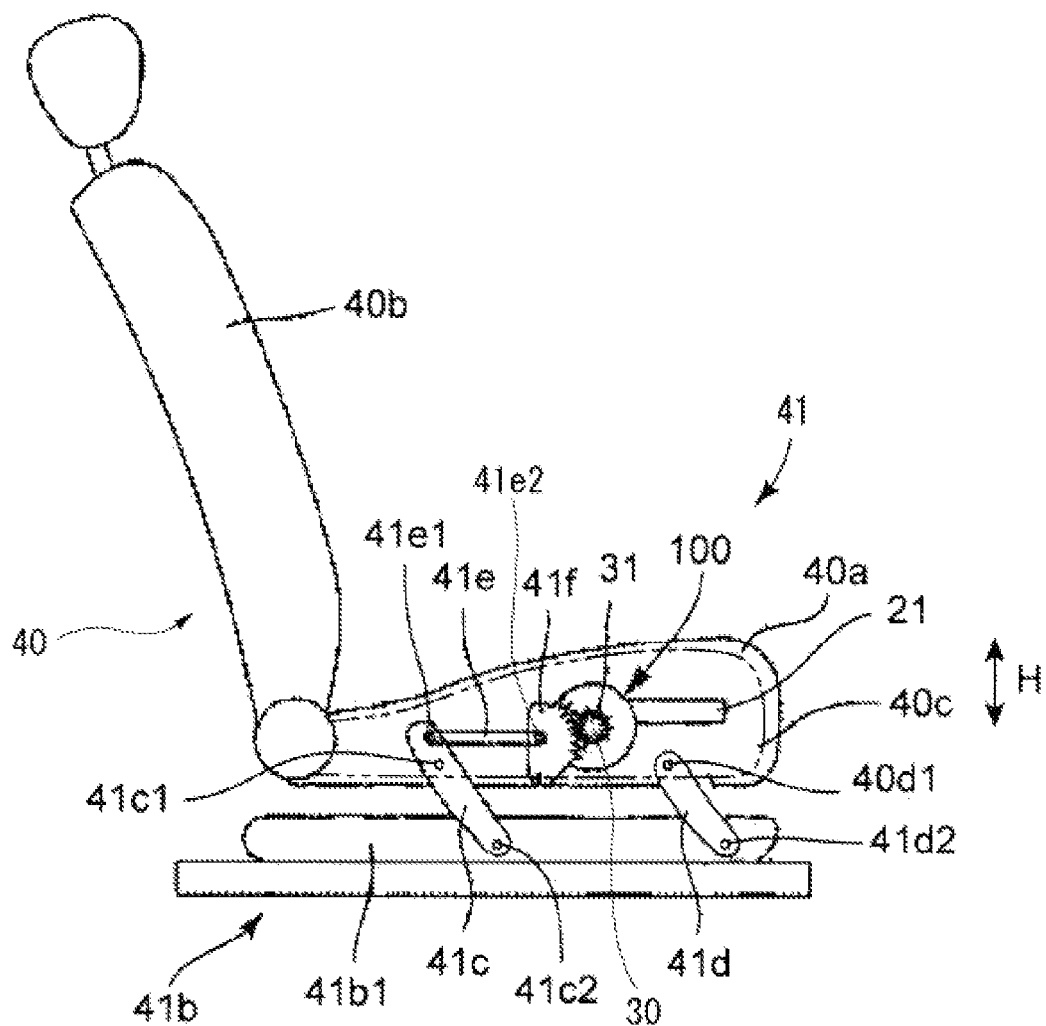
FIG. 1 is a side view showing a state in which a clutch unit for a vehicle according to an embodiment is applied to a vehicle seat lifter.

FIG. 1 is a side view showing a state in which the clutch unit for a vehicle according to the embodiment is applied to a vehicle seat lifter. As shown in FIG. 1, a clutch unit 100 for a vehicle according to the present embodiment is used for a vehicle seat 40. The vehicle seat 40 includes a seating seat 40a, a backrest 40b, and a seat frame 40c. The clutch unit 100 for a vehicle is fixed to the seat frame 40c of the vehicle seat 40. A vehicle seat lifter 41 is mounted on the vehicle seat 40. The vehicle seat lifter 41 includes the clutch unit 100 for a vehicle.

The vehicle seat lifter 41 includes a sector gear 41f and a link mechanism. The clutch unit 100 for a vehicle includes an operation lever 21 that is rotated in forward and reverse directions. A pinion gear 31 integrated with an output shaft member 30 that is driven to rotate in the forward and reverse directions by the operation lever 21 meshes with the sector gear 41f of the vehicle seat lifter 41.

The link mechanism includes a first link member 41c extending in a substantially upper-lower direction, a second link member 41d extending in the substantially upper-lower direction, and a third link member 41e extending in a substantially lateral direction.

An upper portion of the first link member 41c and an upper portion of the second link member 41d are rotatably connected to the seat frame 40c by shaft members 41c1, 41d1, respectively. A lower portion of the first link member 41c and a lower portion of the second link member 41d are rotatably connected to a slide movable member 41b1 of a seat slide adjuster 41b by shaft members 41c2, 41d2, respectively.

One end of the third link member 41e is connected to the first link member 41c by a shaft member 41e1 above the shaft member 41c1. The other end of the third link member 41e is rotatably connected to the sector gear 41f by a shaft member 41e2.

In FIG. 1, when the operation lever 21 is rotated counterclockwise (upward), an input torque (rotational force) in a rotation direction is transmitted to the pinion gear 31, and the pinion gear 31 rotates counterclockwise. Then, the sector gear 41f meshing with the pinion gear 31 rotates clockwise, and the third link member 41e pulls the upper portion of the first link member 41c upward. As a result, both the first link member 41c and the second link member 41d stand up, and a seating surface of the seating seat 40a becomes higher. When a force input on the operation lever 21 is released after a height H of the seating seat 40a is adjusted, the operation lever 21 rotates clockwise and returns to an original position (referred to as a neutral position or a neutral state in the following description).

When the operation lever 21 is rotated clockwise (downward), the seating surface of the seating seat 40a is lowered by an operation opposite to that described above. In addition, when the operation lever 21 is released after the height adjustment, the operation lever 21 rotates counterclockwise to return to the original position (the neutral position, the neutral state).

In a state in which the operation lever 21 is released, a brake is applied to the rotation of the output shaft member 30 (the pinion gear 31) by the clutch unit 100 for a vehicle. Therefore, even when a force in the upper-lower direction is applied to the seating seat 40a, the seating seat 40a is prevented from moving in the upper-lower direction.

<Clutch Unit for Vehicle>

Next, the clutch unit 100 for a vehicle according to the present embodiment will be described. The components of the clutch unit 100 described below are basically made of metal unless otherwise specified.

Figure 2:
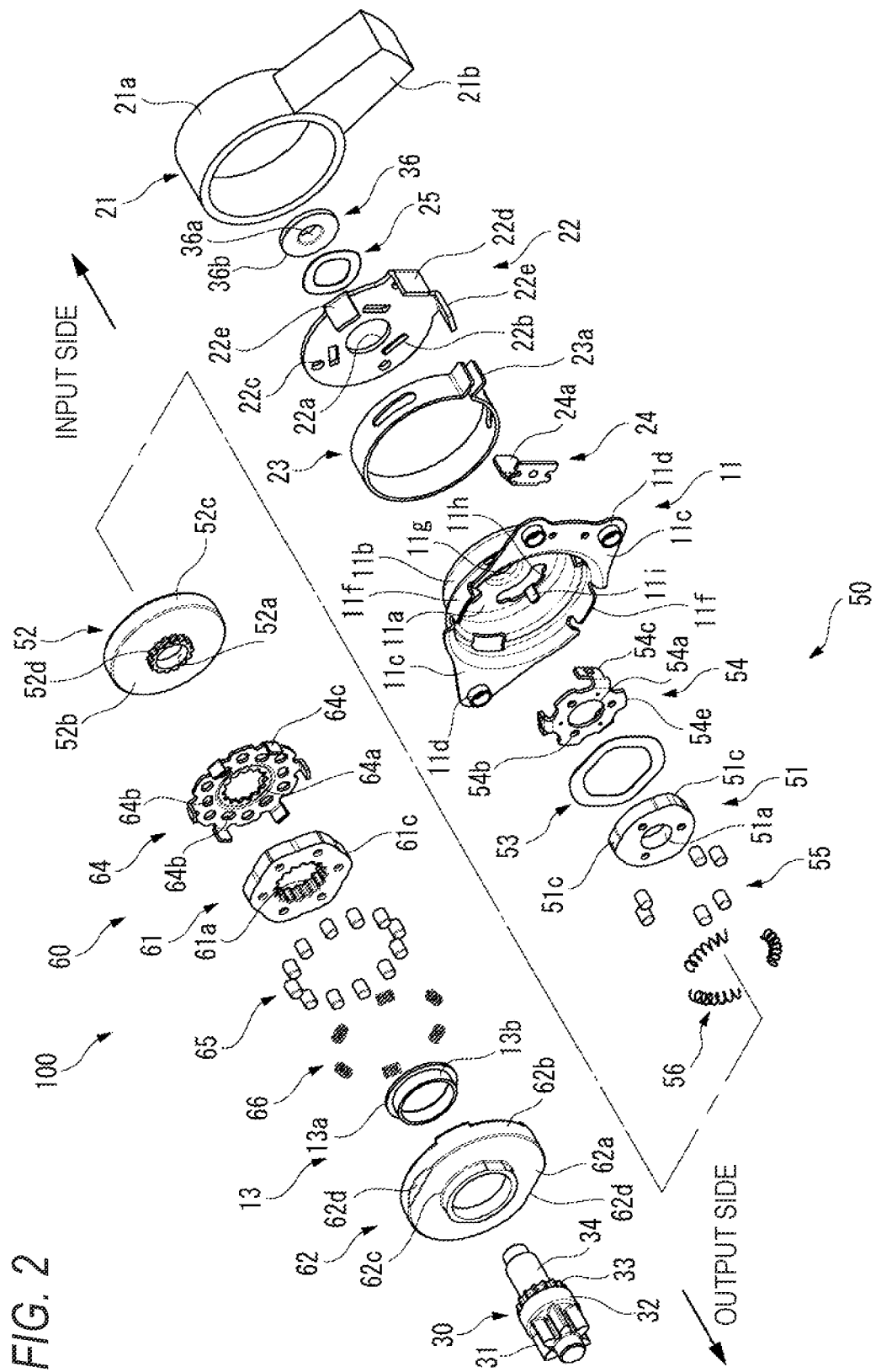
FIG. 2 is an exploded perspective view of the clutch unit for a vehicle.
Figure 3:
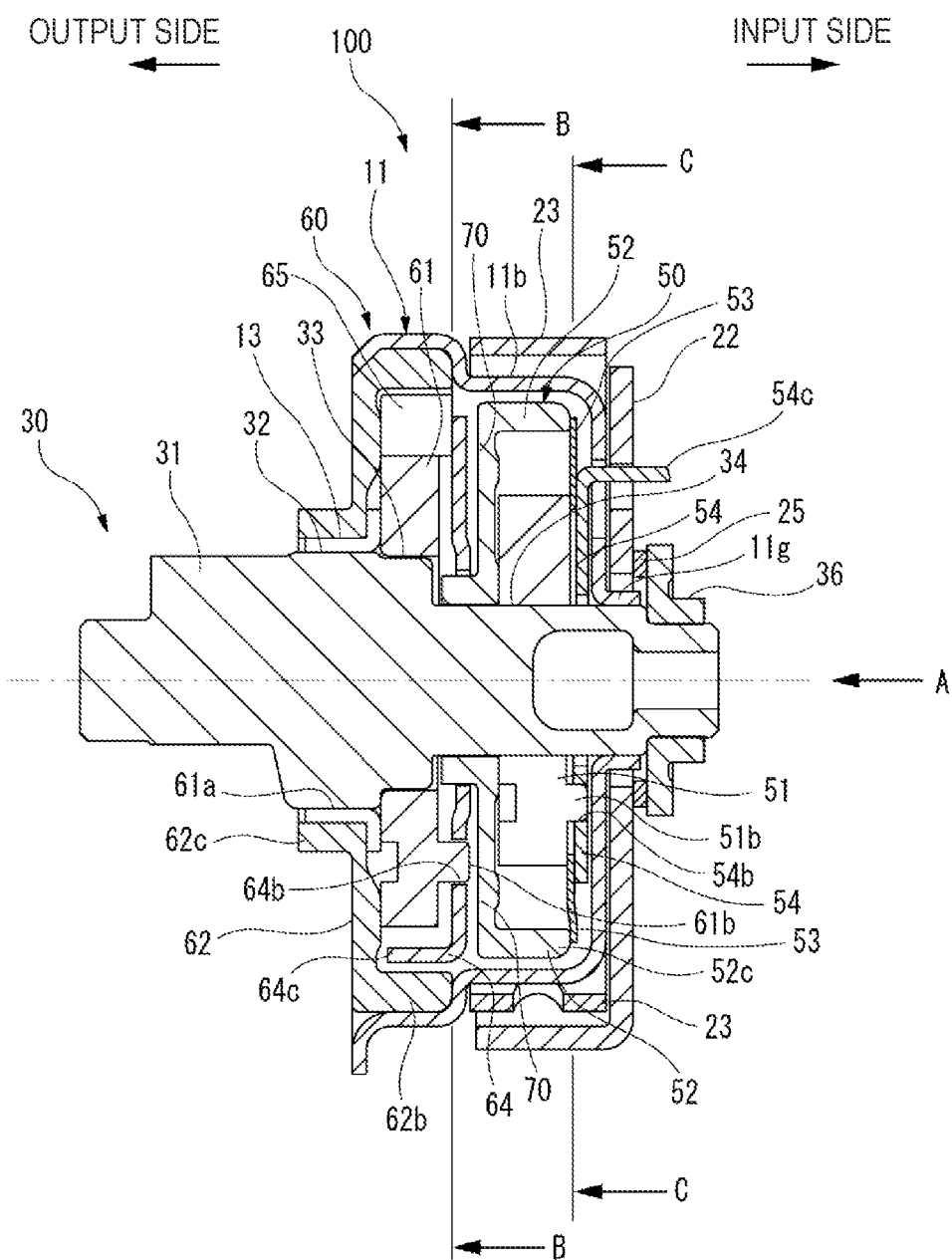
FIG. 3 is a sectional view taken along an axial direction of the clutch unit for a vehicle.

FIG. 2 is an exploded perspective view of the clutch unit 100 for a vehicle. FIG. 3 is a sectional view of the clutch unit 100 for a vehicle taken along an axial direction.

As shown in FIGS. 2 and 3, the clutch unit 100 for a vehicle includes the operation lever 21, the output shaft member 30, an input side clutch 50, an output side clutch 60, and a housing 11.

The input side clutch 50 is driven (performed) by the operation lever 21 to transmit a rotation of the operation lever 21 to the output shaft member 30. The output side clutch 60 prevents the rotation of the output shaft member 30 when the force in the upper-lower direction is applied to the seating seat 40a. The input side clutch 50 and the output side clutch 60 are accommodated in the housing 11. The housing 11 is a member that does not rotate when the operation lever 21 is operated.

The output shaft member 30 is a shaft member extending in a left-right direction in FIG. 3. In the following description, a term "axial direction" means a direction in which the output shaft member 30 extends. As shown in FIG. 3, the output shaft member 30 penetrates through the output side clutch 60 and the input side clutch 50 in this order from the left to the right in FIG. 3. In the following description, a left side in FIG. 3 may be referred to as an output side in the axial direction, and a right side in FIG. 3 may be referred to as an input side in the axial direction.

In the output shaft member 30, the pinion gear 31, a large-diameter cylindrical portion 32, a spline portion 33, and a small-diameter cylindrical portion 34 are provided in this order from the output side to the input side in the axial direction.

The pinion gear 31 is provided at an end portion of the output shaft member 30 on an output side in the axial direction. The large-diameter cylindrical portion 32 is rotatably supported by a metal bush 13 fixed to an output side outer ring member 62 of the output side clutch 60 to be described later. The small-diameter cylindrical portion 34 is rotatably supported by an input side inner ring member 51 and an input side outer ring member 52 of the input side clutch 50 to be described later, and the housing 11. A plurality of groove portions are formed on an outer peripheral surface of the spline portion 33. The spline portion 33 is spline-coupled to an output side inner ring member 61 of the output side clutch 60 to be described later.

A stopper ring 36 is mounted to the small-diameter cylindrical portion 34 of the output shaft member 30. The stopper ring 36 includes a cylindrical fitting portion 36a and a disk-shaped flange portion 36b which is positioned on the output side of the fitting portion 36a in the axial direction. The small-diameter cylindrical portion 34 of the output shaft member 30 is fitted into the fitting portion 36a. The flange portion 36b abuts against a second urging member 25 to be described later, and prevents the second urging member 25, an operation plate 22 to be described later, the housing 11, the input side clutch 50, and the output side clutch 60 from coming out of the output shaft member 30.

The housing 11 is a cup-shaped (bottomed cylindrical) member and includes a bottom surface 11a and a tubular portion 11b. Two fixing flanges 11c protruding in a radial direction are formed at end portions of the tubular portion 11b on the output side in the axial direction from the bottom surface 11a. The fixing flange 11c is provided with a fixing bolt insertion hole 11d. The housing 11 is fixed to the seat frame 40c by screwing bolts (not shown) inserted into the fixing bolt insertion holes 11d into screw holes of the seat frame 40c. The housing 11 may be fixed to the seat frame 40c by providing a caulking portion in the housing 11 and caulking the caulking portion to the seat frame 40c.

A spring locking portion 24 having a spring locking piece 24a is fixed to one fixing flange 11c. The spring locking piece 24a extends to the input side in the axial direction along the tubular portion 11b of the housing 11.

A tubular bearing 11g is formed at a center portion of the bottom surface 11a in the radial direction by burring. The bearing 11g extends from the bottom surface 11a toward the input side in the axial direction. In addition, the bottom surface 11a is formed with three window portions 11h each having a circular arc-shaped long hole, and three protruding pieces 11i extending from edge portions of the respective window portions 11h toward the output side in the axial direction.

The operation lever 21 is formed of, for example, a synthetic resin, and is fixed to the operation plate 22 to be described later. The operation lever 21 includes a fixing portion 21a fixed to the operation plate 22 and a rod-shaped gripping portion 21b extending outward in the radial direction from the fixing portion 21a.

The operation plate 22 is provided between the housing 11 and the operation lever 21 in a rotation axis direction (axial direction). When an operator grips the gripping portion 21b of the operation lever 21 and rotates the operation lever 21 in the forward and reverse directions around the rotation axis, the operation plate 22 rotates in the forward and reverse directions integrally with the operation lever 21. The operation plate 22 is rotatably supported by the housing 11.

The operation plate 22 includes an insertion hole 22a at the center in the radial direction thereof. The small-diameter cylindrical portion 34 of the output shaft member 30 is inserted through the insertion hole 22a. In addition, the operation plate 22 includes three rectangular engaging holes 22b and a circular fixing hole 22c around the insertion hole 22a. The operation plate 22 is fixed to the operation lever 21 by screwing a screw (not shown) inserted through the fixing hole 22c into the operation lever 21.

An operation piece portion 22d and a pair of regulating piece portions 22e are provided on an outer peripheral edge of the operation plate 22. The operation piece portion 22d is provided between the pair of regulating piece portions 22e. The operation piece portion 22d and the pair of regulating piece portions 22e extend toward the output side in the axial direction.

A return spring 23 is provided on an outer periphery of the housing 11. The return spring 23 is a spring that returns the operation lever 21 (and the operation plate 22) to a neutral position when no operating force is applied to the operation lever 21 (when the operating force is released). The return spring 23 is, for example, a leaf spring having a circular arc shape in which both free end portions 23a are brought close to each other. The spring locking piece 24a of the spring locking portion 24 fixed to the housing 11 and the operation piece portion 22d of the operation plate 22 are arranged between both the free end portions 23a of the return spring 23.

The second urging member 25 is provided between the operation plate 22 and the stopper ring 36 in the rotation axis direction. The second urging member 25 is provided at a position farther from the bottom surface 11a of the housing 11 (the input side in the axial direction) than the operation plate 22. The second urging member 25 is formed of a wave washer or the like in which spring steel is formed in a ring shape, and has a wave shape in which a plurality of curved portions are alternately formed along a peripheral direction. The second urging member 25 applies an urging force against the operation plate 22 toward the bottom surface 11a of the housing 11.

Figure 4A:
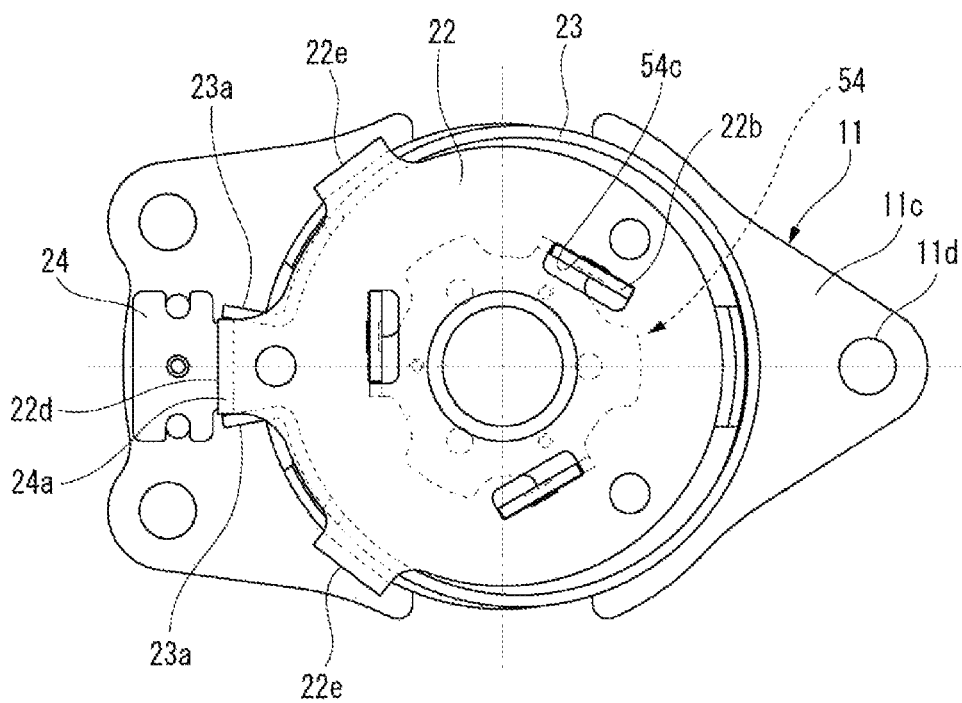
FIG. 4A is a view that illustrates a movement of an operation plate and is view taken along an arrow A in FIG. 3 in a neutral state.
Figure 4B:
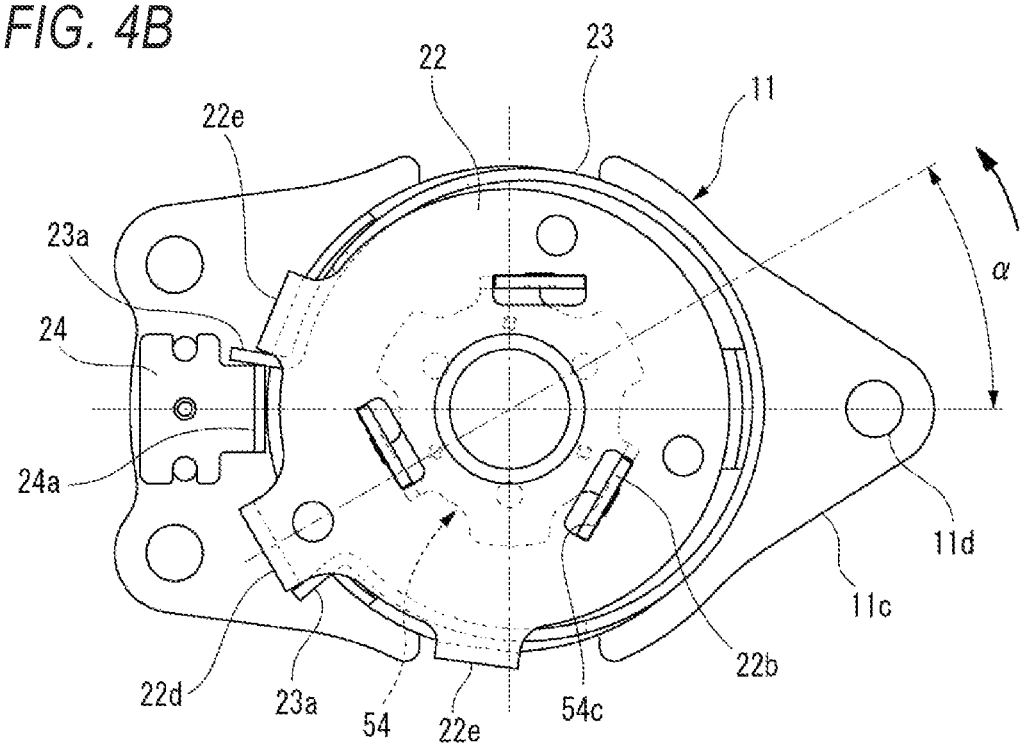
FIG. 4B is a view that illustrates the movement of the operation plate and is view taken along the arrow A in FIG. 3 in a driving state.

FIGS. 4A and 4B are views that illustrate a movement of the operation plate 22. FIGS. 4A and 4B are views taken along an arrow A in FIG. 3. FIG. 4A shows a neutral state, and FIG. 4B shows a driving state.

As shown in FIG. 4A, in a state in which the operator does not apply an operating force to the operation lever 21 (neutral state), the pair of free end portions 23a of the return spring 23 abut against the spring locking pieces 24a and the operation piece portion 22d, and the operation lever 21 is supported at the neutral position.

As shown in FIG. 4B, when the operator rotates the operation lever 21 to either of the forward and reverse directions around the rotation axis to bring it into the driving state, the operation plate 22 rotates with respect to the housing 11 together with the operation lever 21. Then, one free end portion 23a of the pair of free end portions 23a maintains an engaged state with the spring locking piece 24a fixed to the housing 11, and the other free end portion 23a engages with the operation piece portion 22d of the operation plate 22 to move away from the one free end portion 23a. Therefore, the return spring 23 is bent and a return force for causing the return spring 23 to return to the neutral position is applied.

When a rotation amount of the operation lever 21 reaches a predetermined amount, the regulating piece portion 22e of the operation plate 22 abuts against the free end portion 23a abutting against the spring locking piece 24a, and further rotation of the operation lever 21 is regulated.

<Input Side Clutch>

Referring back to FIGS. 2 and 3, the input side clutch 50 includes the input side inner ring member 51, the input side outer ring member 52, a rotation suppressing member 53, an operation bracket (an example of an operation member) 54, an input side clutch roller (an example of an input side transmission member) 55, and an input side roller urging spring 56.

The input side inner ring member 51 is a columnar member extending in the axial direction. The input side inner ring member 51 includes an insertion hole 51a through which the small-diameter cylindrical portion 34 of the output shaft member 30 is inserted at the center of the insertion hole 51a. Three protruding portions 51b are formed on a surface of the input side inner ring member 51 on the input side in the axial direction (see FIG. 3). Three wedge cam portions 51c that bulge outward are provided at equal intervals on an outer peripheral edge of the input side inner ring member 51.

The operation bracket 54 is a substantially disk-shaped member. The operation bracket 54 includes an insertion hole 54a through which the small-diameter cylindrical portion 34 of the output shaft member 30 is inserted at the center in the radial direction. In addition, the operation bracket 54 includes three fitting holes 54b into which the protruding portions 51b of the input side inner ring member 51 are fitted. By a fitting structure of the protruding portion 51b and the fitting hole 54b, the separate input side inner ring member 51 and operation bracket 54 are connected to each other so as to rotate integrally with each other and so as to be relatively movable in the rotation axis direction.

Three claw portions 54c are provided on an outer peripheral edge of the operation bracket 54. The claw portions 54c penetrate through the window portions 11h formed on the bottom surface 11a of the housing 11 and are fitted into the engaging holes 22b of the operation plate 22. Accordingly, the operation bracket 54 is configured to be connected to the operation plate 22 and rotate integrally with the operation plate 22. In addition, the input side inner ring member 51 is fixed to the operation plate 22 via the operation bracket 54.

The rotation suppressing member 53 is provided between the input side outer ring member 52 and the operation bracket 54 in the rotation axis direction. The rotation suppressing member 53 is provided on the input side in the axial direction of the input side outer ring member 52. The rotation suppressing member 53 is formed of a wave washer or the like in which spring steel is formed in a ring shape, and has a wave shape in which a plurality of curved portions are alternately formed along the peripheral direction. The rotation suppressing member 53 is shown between the input side inner ring member 51 and the operation bracket 54 in FIG. 2, an inner diameter of the rotation suppressing member 53 is larger than an outer diameter of the input side inner ring member 51, and the rotation suppressing member 53 does not apply an axial force to the input side inner ring member 51.

A surface of the rotation suppressing member 53 on the output side in the axial direction abuts against the input side outer ring member 52. Specifically, the surface of the rotation suppressing member 53 on the output side abuts against an outer peripheral edge portion of the input side outer ring member 52. A surface of the rotation suppressing member 53 on the input side abuts against the operation bracket 54. Specifically, a surface of the rotation suppressing member 53 on the input side abuts against an outer peripheral edge portion 54e of the operation bracket 54.

The rotation suppressing member 53 urges the input side outer ring member 52 and the operation bracket 54 in a direction in which they are separated from each other. The rotation suppressing member 53 presses the input side outer ring member 52 toward the output side in the axial direction, and presses the operation bracket 54 to the input side in the axial direction.

The input side outer ring member 52 includes a bottom portion 52b, an outer ring portion 52c, and a fixing portion 52d. The bottom portion 52b is a disk-shaped portion. An insertion hole 52a through which the small-diameter cylindrical portion 34 of the output shaft member 30 is inserted is provided at the center of the bottom portion 52b in the radial direction. The outer ring portion 52c is a cylindrical portion formed so as to extend from an outer edge portion of the bottom portion 52b to the input side in the axial direction. The bottom portion 52b is provided at an end portion of the outer ring portion 52c on the output side in the axial direction. The fixing portion 52d protrudes from an outer edge of the insertion hole 52a toward the output side in the axial direction. A spline groove is formed on an outer peripheral surface of the fixing portion 52d. The fixing portion 52d is spline-coupled coupled to a release bracket 64 of the output side clutch 60 to be described later.

The outermost diameter of the operation bracket 54 is equal to or larger than an inner diameter of the outer ring portion 52c of the input side outer ring member 52. The rotation suppressing member 53 is arranged in a region where the input side outer ring member 52 and the operation bracket 54 face each other in the rotation axis direction (see FIG. 3).

Figure 5A:
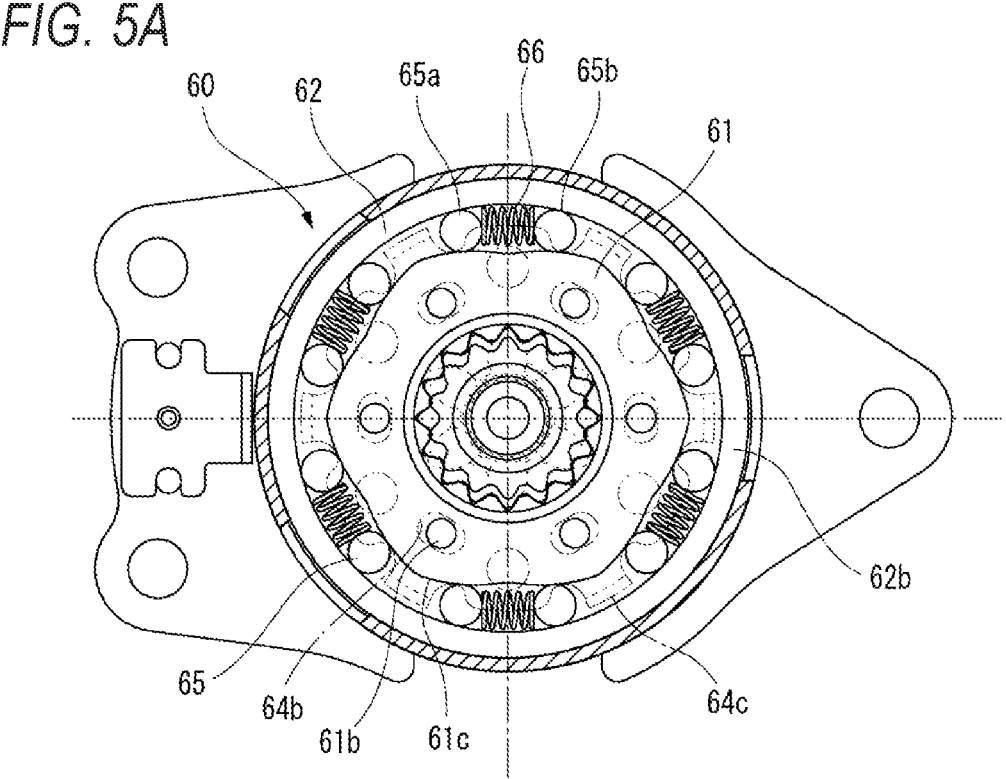
FIG. 5A is a view that illustrates an internal operation of the clutch unit for a vehicle and is a sectional view taken along a line B-B in FIG. 3.
Figure 5B:
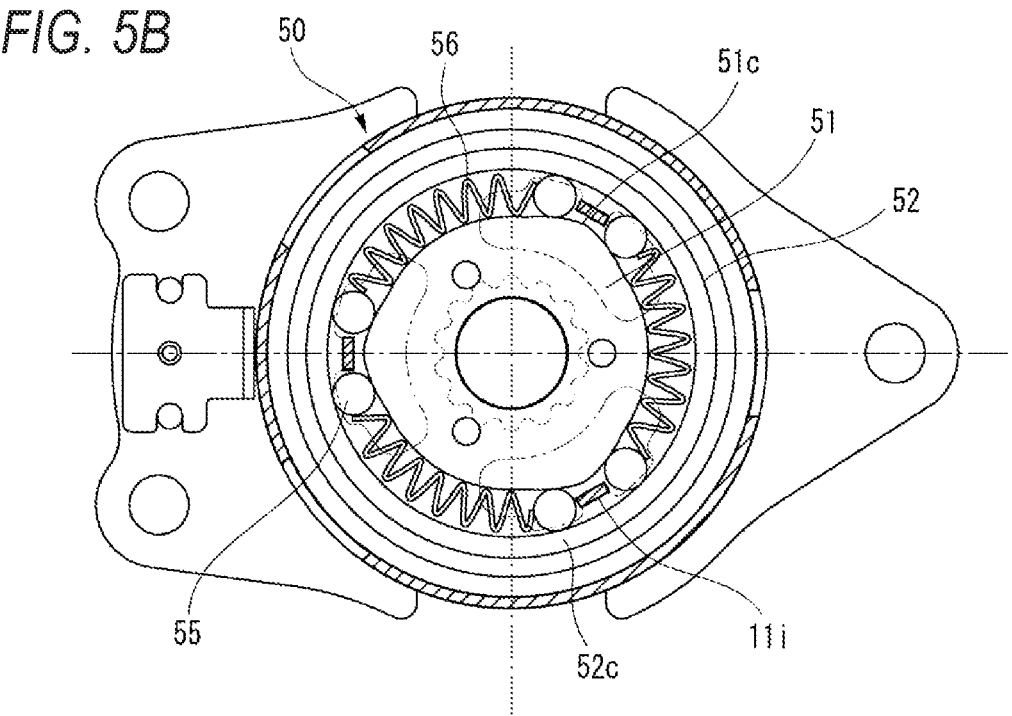
FIG. 5B is a view that illustrates the internal operation of the clutch unit for a vehicle and is a sectional view taken along a line C-C in FIG. 3.

FIGS. 5A and 5B are views showing the clutch unit 100 for a vehicle in the neutral state shown in FIG. 4A. FIG. 5A is a sectional view taken along a line B-B in FIG. 3, showing the output side clutch 60 in the neutral state. FIG. 5B is a sectional view taken along a line C-C in FIG. 3, showing the input side clutch 50 in the neutral state.

As shown in FIG. 5B, a gap is provided between an inner peripheral surface of the input side outer ring member 52 and an outer peripheral surface of the input side inner ring member 51. The inner peripheral surface of the input side outer ring member 52 is a circumferential surface, and the three wedge cam portions 51c that bulge outward are provided on the outer peripheral surface of the input side inner ring member 51. Therefore, in the gap between the inner peripheral surface of the input side outer ring member 52 and the outer peripheral surface of the input side inner ring member 51, three portions in which both ends in the radial direction are tapered in a wedge shape are formed. The three protruding pieces 11i of the housing 11 protrude in this gap. When the input side inner ring member 51 is rotated by the operation lever 21, the protruding piece 11i regulates a movement of the input side clutch roller 55.

The input side clutch 50 includes six input side clutch rollers 55 and three input side roller urging springs 56. The input side clutch roller 55 and the input side roller urging spring 56 are arranged between the outer peripheral surface of the input side inner ring member 51 and the inner peripheral surface of the outer ring portion 52c of the input side outer ring member 52.

The input side roller urging spring 56 is arranged between the wedge cam portions 51c of the input side inner ring member 51 in the radial direction. In addition, a pair of input side clutch rollers 55 are arranged on each of both sides of the wedge cam portion 51c of the input side inner ring member 51. The protruding piece 11i of the housing 11 is arranged between the pair of input side clutch rollers 55.

<Output Side Clutch>

Referring back to FIGS. 2 and 3, the output side clutch 60 includes the output side inner ring member 61, the output side outer ring member 62, the release bracket (an example of a pressing force transmission portion) 64, an output side clutch roller (an example of an output side transmission member) 65, and an output side roller urging spring 66.

The output side outer ring member 62 is a substantially cylindrical member. The output side outer ring member 62 is provided coaxially with a rotation shaft of the output shaft member 30, and is rotatable relative to the output side inner ring member 61. The output side outer ring member 62 is arranged on an outer peripheral side of the output side inner ring member 61. An inner peripheral surface of an inner hole of the output side outer ring member 62 rotatably supports the large-diameter cylindrical portion 32 of the output shaft member 30 via a cylindrical portion 13b of the metal bush 13. The flange portion 13a of the metal bush 13 is in sliding contact with the output side inner ring member 61 to prevent the output side inner ring member 61 from coming out of the output shaft member 30. The cylindrical portion 13b of the metal bush 13 is made of resin. The metal bush 13 exerts a frictional force on the output shaft member 30 to suppress a rotational speed of the output shaft member 30 when the vehicle seat 40 is lowered.

The output side outer ring member 62 includes a disk-shaped bottom portion 62a, a first cylindrical portion 62b extending from the bottom portion 62a to the input side in the axial direction, and a second cylindrical portion 62c extending from the bottom portion 62a to the output side in the axial direction. The second cylindrical portion 62c has a smaller diameter than the first cylindrical portion 62b.

Two tapered portions 62d are provided at an outer peripheral edge of the output side outer ring member 62. The output side outer ring member 62 is fixed to the housing 11 so as to be unable to rotate, by bending the caulking portion 11f provided in the housing 11 radially inward and caulking the outer peripheral edge of the output side outer ring member 62.

The output side inner ring member 61 is a substantially cylindrical member. The output side inner ring member 61 is provided coaxially with the rotation shaft of the output shaft member 30 and rotates integrally with the output shaft member 30. The output side inner ring member 61 is a member having a smaller diameter than the first cylindrical portion 62b of the output side outer ring member 62. A plurality of groove portions are provided on an inner peripheral surface of an inner hole of the output side inner ring member 61 to form a spline portion 61a to which the spline portion 33 of the output shaft member 30 is coupled. Six protruding portions 61b are formed on a surface of the output side inner ring member 61 on the input side in the axial direction (see FIG. 3). Six wedge cam portions 61c that bulge outward are formed at equal intervals on an outer peripheral portion of the output side inner ring member 61.

The release bracket 64 is a substantially disk-shaped member and is arranged on the input side in the axial direction of the output side inner ring member 61. The release bracket 64 is connected to the input side outer ring member 52 and rotates together with the input side outer ring member 52. An outer diameter of the release bracket 64 is formed to be larger than an outer diameter of the output side inner ring member 61 and smaller than an inner diameter of the first cylindrical portion 62b of the output side outer ring member 62. The release bracket 64 is a separated member from the output side inner ring member 61, the output side outer ring member 62, the input side inner ring member 51, and the input side outer ring member 52.

The release bracket 64 is provided so that an outer peripheral edge thereof abuts against the output side clutch rollers 65. Further, the release bracket 64 is configured to displace the output side clutch roller 65 to switch between a locked state in which the output side inner ring member 61 and the output side outer ring member 62 cannot rotate relative to each other, and a lock release state in which the output side inner ring member 61 and the output side outer ring member 62 can rotate relative to each other. Details of the locked state and the lock release state will be described later.

A first engaging hole 64a including a plurality of groove portions on an inner peripheral surface is formed in a central portion of the release bracket 64. The first engaging hole 64a is spline-coupled to the fixing portion 52d of the input side outer ring member 52. Accordingly, the release bracket 64 is rotatable together with the input side outer ring member 52.

The release bracket 64 includes a plurality of second engaging holes 64b into which the protruding portions 61b of the output side inner ring member 61 are inserted. Each of the second engaging holes 64b is a long hole extending in the peripheral direction. The protruding portion 61b is slightly displaceable in the peripheral direction in the second engaging hole 64b. That is, the release bracket 64 and the output side inner ring member 61 are relatively rotatable within a range in which the protruding portion 61b is displaced in the second engaging hole 64b. Six protruding pieces 64c extending toward the output side in the axial direction are provided on an outer peripheral edge of the release bracket 64.

In addition, the release bracket 64 is configured to transmit, to the output side clutch roller 65, an urging force which is urged on the output side in an output shaft direction from the rotation suppressing member 53 to the input side outer ring member 52.

As shown in FIG. 5A, a gap is provided between an inner peripheral surface of the output side outer ring member 62 and an outer peripheral surface of the output side inner ring member 61. The inner peripheral surface of the output side outer ring member 62 is a circumferential surface, and the six wedge cam portions 61c that bulge outward are provided on the outer peripheral surface of the output side inner ring member 61. Therefore, in the gap between the inner peripheral surface of the output side outer ring member 62 and the outer peripheral surface of the output side inner ring member 61, six portions in which both ends in the radial direction are tapered in a wedge shape are formed. The six protruding pieces 64c of the release bracket 64 protrude into the gaps between these portions. When the release bracket 64 is rotated, the protruding piece 64c moves inside the gap.

The output side clutch 60 includes twelve output side clutch rollers 65 and six output side roller urging springs 66. The output side clutch roller 65 and the output side roller urging spring 66 are arranged in the gap between the outer peripheral surface of the output side inner ring member 61 and an inner peripheral surface of the first cylindrical portion 62b of the output side outer ring member 62. The output side clutch roller 65 is a member that is arranged between the outer peripheral surface of the output side inner ring member 61 and the inner peripheral surface of the output side outer ring member 62 and configured to transmit a rotational force between the output side inner ring member 61 and the output side outer ring member 62. The output side clutch roller 65 is provided so that a surface on the input side in the axial direction abuts against the outer peripheral edge portion of the release bracket 64.

The output side roller urging spring 66 is arranged between the wedge cam portions 61c of the output side inner ring member 61 in the radial direction. Further, a pair of output side clutch rollers 65 are arranged on each of both sides of the wedge cam portion 61c of the output side inner ring member 61. The protruding piece 64c of the release bracket 64 is arranged between the pair of output side clutch rollers 65. The output side clutch rollers 65 are urged toward the top of the wedge cam portions 61c by the output side roller urging spring 66.

Next, an operation of the clutch unit 100 for a vehicle having the above configuration will be described. In the following description, a case where the operation lever 21 is rotated counterclockwise will be described. When the operation lever 21 is rotated clockwise, a rotation direction is only reverse to that in the following description, and thus the description thereof will be omitted.

<Rotation Operation of Operation Lever>

As shown in FIG. 4A, in the clutch unit 100 for a vehicle, in the neutral state, the pair of free end portions 23a of the return spring 23 abut against the spring locking pieces 24a and the operation piece portions 22d.

As shown in FIG. 4B, when the operation lever 21 is rotated counterclockwise by a rotation angle α from the neutral position, one free end portion 23a of the pair of free end portions 23a maintains the engaged state with the spring locking piece 24a, and the other free end portion 23a engages with the operation piece portion 22d of the operation plate 22 to move away from the one free end portion 23a.

When the regulating piece portion 22e of the operation plate 22 abuts against the free end portion 23a abutting against the spring locking piece 24a, the rotation of the operation lever 21 is regulated. The state in which the rotation of the operation lever 21 is regulated is the maximum operation state of the operation lever 21. That is, the operation lever 21 is rotatable within a range in which the rotation angle from the neutral state to the maximum operation state becomes the maximum operation angle αmax. In addition, when the operation lever 21 is rotated, the return spring 23 is bent and the return force for casing the return spring 23 to return to the neutral position is applied.

Next, an operation from the neutral state to the maximum operation state will be described.

<Neutral State>

FIG. 5A shows the output side clutch 60 in the neutral state. As shown in FIG. 5A, in the neutral state, in the output side clutch 60, the output side clutch roller 65 is urged toward the top of the wedge cam portion 61c by the output side roller urging spring 66. Thus, the output side clutch roller 65 bites into a wedge-shaped gap between the wedge cam portion 61c of the output side inner ring member 61 and the inner peripheral surface of the first cylindrical portion 62b of the output side outer ring member 62.

More specifically, a gap where a first output side clutch roller 65a is positioned has a wedge shape that tapers counterclockwise. The first output side clutch roller 65a is urged counterclockwise by the output side roller urging spring 66. Therefore, the first output side clutch roller 65a bites into the output side inner ring member 61 and the output side outer ring member 62 in the counterclockwise direction. A gap where a second output side clutch roller 65b is positioned has a wedge shape that tapers clockwise. The second output side clutch roller 65b is urged clockwise by the output side roller urging spring 66. Therefore, the second output side clutch roller 65b bites into the output side inner ring member 61 and the output side outer ring member 62 in the clockwise direction.

The output side outer ring member 62 is not movable with respect to the housing 11. Further, the first output side clutch roller 65a and the second output side clutch roller 65b bite into both the output side inner ring member 61 and the output side outer ring member 62 in the counterclockwise direction and in the clockwise direction, respectively. Therefore, the output side inner ring member 61 and the output side outer ring member 62 cannot rotate. As a result, the output shaft member 30 spline-coupled to the output side inner ring member 61 cannot rotate.

As described above, in the neutral state, since the output side inner ring member 61 and the output side outer ring member 62 are in a locked state in which the output side inner ring member 61 and the output side outer ring member 62 cannot rotate, the output shaft member 30 does not rotate even when the rotational force is applied from the vehicle seat 40 side to the output shaft member 30. As a result, the vehicle seat 40 is fixed in a state in which a height thereof is maintained.

FIG. 5B shows the input side clutch 50 in the neutral state. As shown in FIG. 5B, in the neutral state, in the input side clutch 50, the input side clutch roller 55 is in contact with the input side roller urging spring 56, and the input side clutch roller 55 is urged toward the top of the wedge cam portion 51c by the input side roller urging spring 56. Therefore, in the neutral state, the input side clutch roller 55 bites into the input side inner ring member 51 and the input side outer ring member 52. Accordingly, when the operation lever 21 is rotated, the input side outer ring member 52 can rotate together with the input side inner ring member 51 via the input side clutch roller 55.

<Initial Stage of Rotation>

Figure 6A:
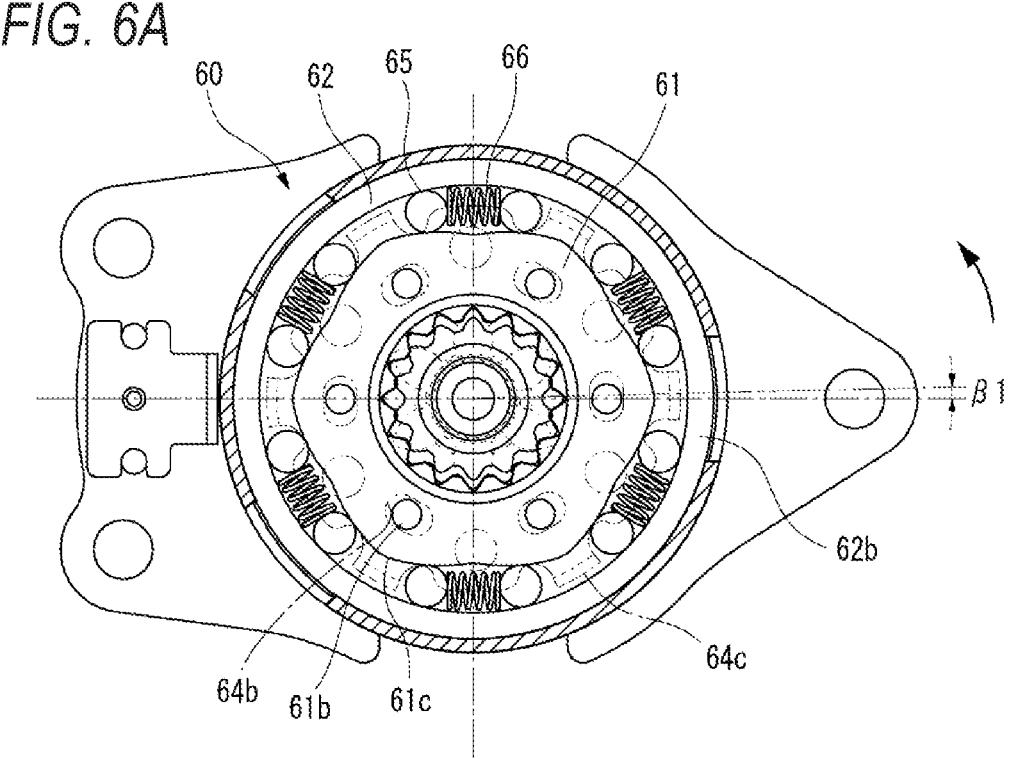
FIG. 6A is a view that illustrates the internal operation of the clutch unit for a vehicle and is a sectional view taken along the line B-B in FIG. 3.
Figure 6B:
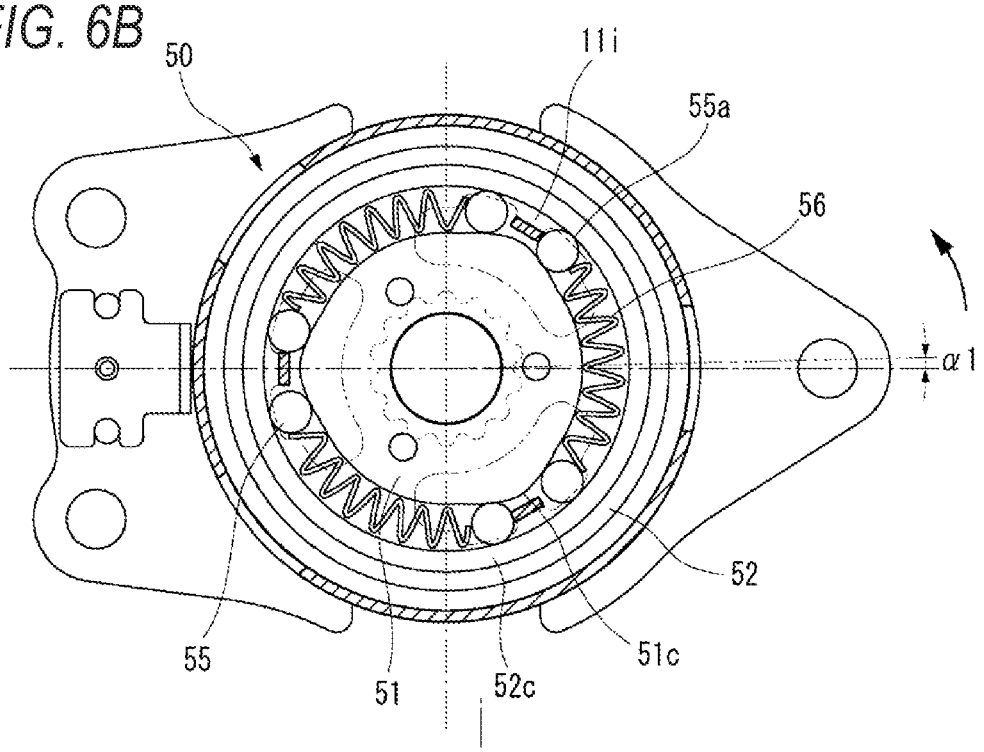
FIG. 6B is a view that illustrates the internal operation of the clutch unit for a vehicle and is a sectional view taken along the line C-C in FIG. 3.

FIGS. 6A and 6B are views showing a state in which the operation lever 21 is rotated counterclockwise by a small angle α1 from the neutral position. FIG. 6A shows the output side clutch 60, and FIG. 6B shows the input side clutch 50.

As shown in FIG. 6B, when the operation lever 21 is rotated counterclockwise by the angle α1 from the neutral position, the rotation is transmitted to the input side inner ring member 51 via the operation plate 22 and the operation bracket 54. Then, the input side inner ring member 51 is rotated together with the operation lever 21 by the angle α1, and the input side outer ring member 52 is rotated together with the input side inner ring member 51 via the input side clutch roller 55.

The input side outer ring member 52 of the input side clutch 50 is spline-coupled to the release bracket 64. Therefore, when the input side outer ring member 52 is rotated, as shown in FIG. 6A, the release bracket 64 also rotates by an angle β1 together with the input side outer ring member 52.

In the state shown in FIG. 6A, an inner peripheral surface of the second engaging hole 64b of the release bracket 64 is not in contact with the protruding portion 61b of the output side inner ring member 61. Therefore, the rotation from the input side outer ring member 52 is not transmitted to the output side inner ring member 61 and the output side outer ring member 62, and the output side inner ring member 61 and the output side outer ring member 62 do not rotate.

<Output Side Lock Release>

Figure 7A:
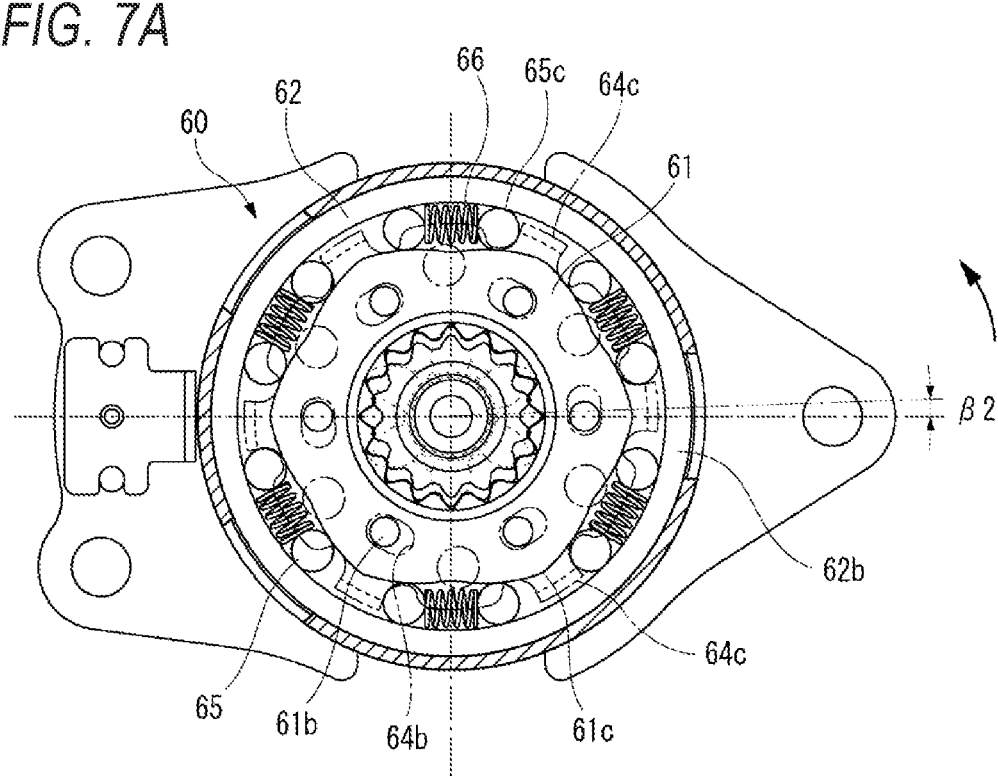
FIG. 7A is a view that illustrates the internal operation of the clutch unit for a vehicle and is a sectional view taken along the line B-B in FIG. 3.
Figure 7B:
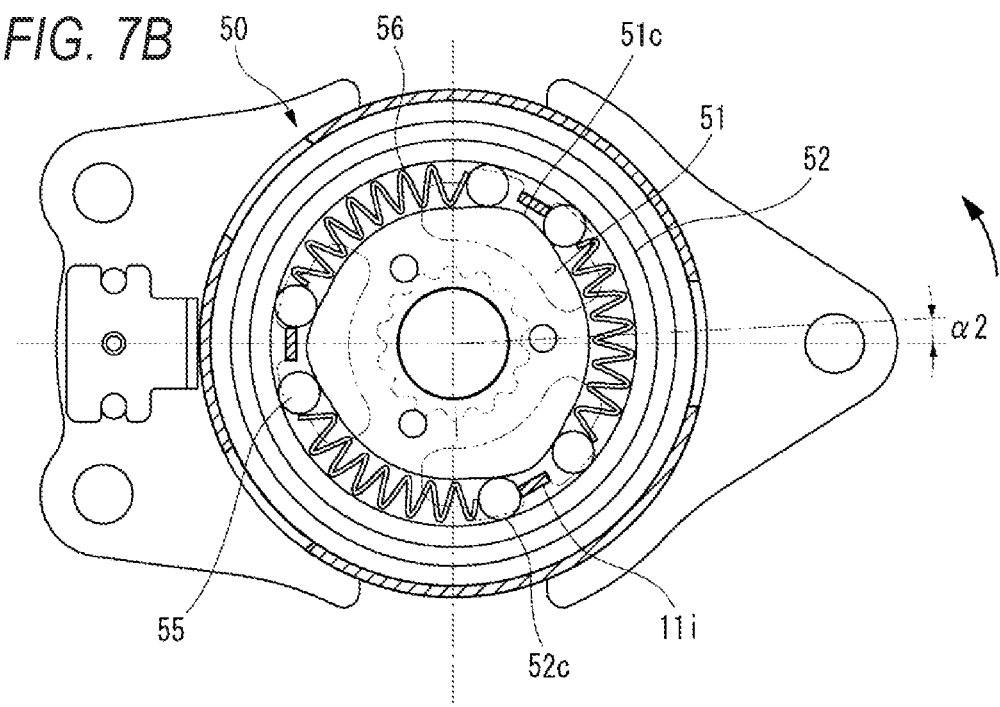
FIG. 7B is a view that illustrates the internal operation of the clutch unit for a vehicle and is a sectional view taken along the line C-C in FIG. 3.

FIGS. 7A and 7B are views showing a state in which the operation lever 21 is further rotated counterclockwise from the state of FIGS. 6A and 6B. FIG. 7A shows the output side clutch 60, and FIG. 7B shows the input side clutch 50.

As shown in FIG. 7B, when the operation lever 21 is further rotated counterclockwise, the input side inner ring member 51 and the input side outer ring member 52 are rotated so that the rotational angles of the input side inner ring member 51 and the input side outer ring member 52 become α2 (α2>α1).

Then, as shown in FIG. 7A, the release bracket 64 that rotates together with the input side outer ring member 52 is rotated to an angle β2. When a rotation angle of the release bracket 64 reaches β2 (output side lock release angle), the protruding piece 64c of the release bracket 64 abuts against an output side clutch roller 65c adjacent to the protruding piece 64c in the counterclockwise direction, and presses the output side clutch roller 65c in a counterclockwise rotation direction. Then, the biting of the output side clutch roller 65c into the wedge cam portion 61c and the inner peripheral surface of the first cylindrical portion 62b is released. As a result, the output side outer ring member 62 and the output side inner ring member 61 are in a state in which they can rotate counterclockwise.

<Rotational Force Transmission State>

Figure 8A:
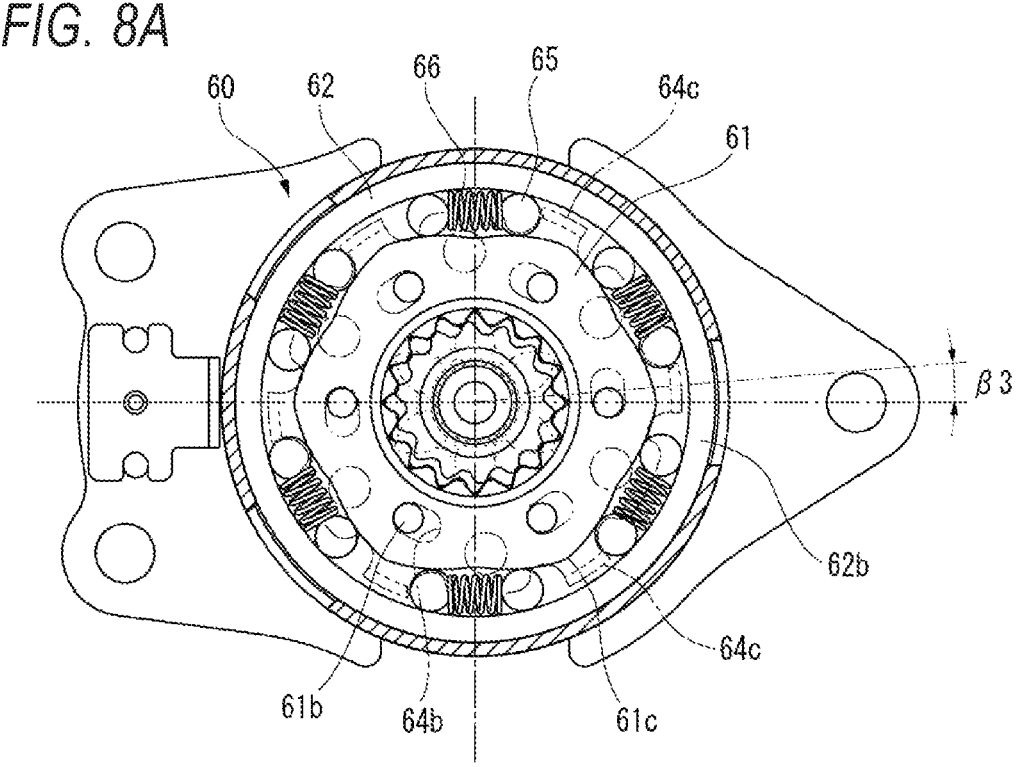
FIG. 8A is a view that illustrates the internal operation of the clutch unit for a vehicle and is a sectional view taken along the line B-B in FIG. 3.
Figure 8B:
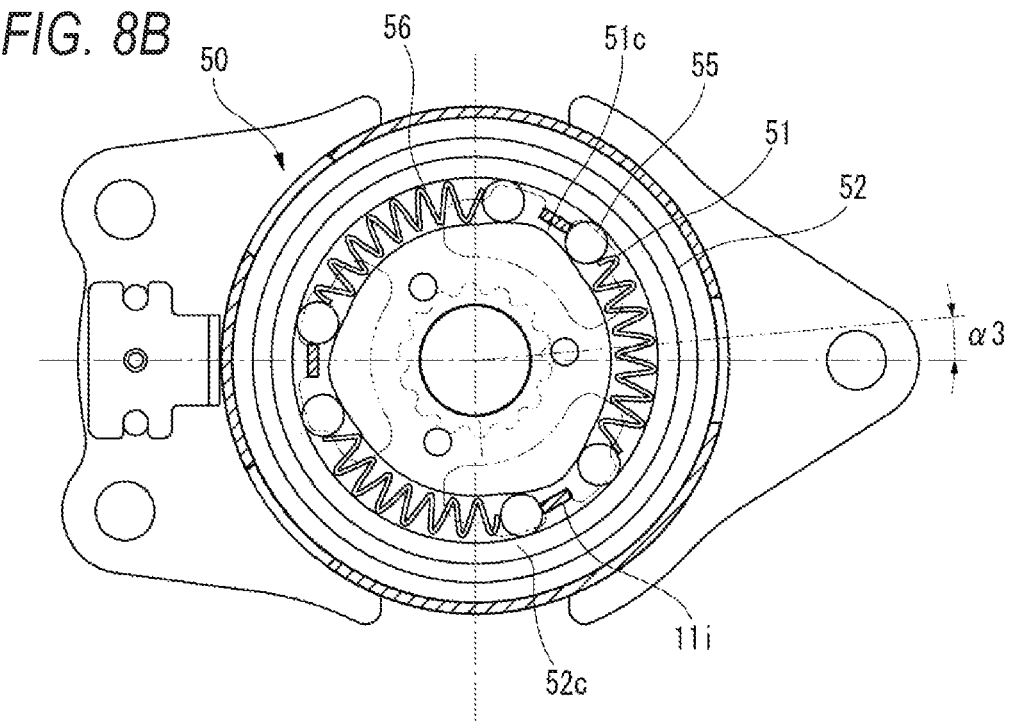
FIG. 8B is a view that illustrates the internal operation of the clutch unit for a vehicle and is a sectional view taken along the line C-C in FIG. 3.

FIGS. 8A and 8B are views showing a state in which the operation lever 21 is further rotated counterclockwise from the state of FIGS. 7A and 7B. FIG. 8A shows the output side clutch 60, and FIG. 8B shows the input side clutch 50.

As shown in FIG. 8B, when the operation lever 21 is further rotated counterclockwise, the input side inner ring member 51 and the input side outer ring member 52 are rotated so that the rotational angles of the input side inner ring member 51 and the input side outer ring member 52 become α3 (α3>α2).

Then, as shown in FIG. 8A, the release bracket 64 is rotated counterclockwise to an angle β3 (β3>β2). When the rotation angle of the release bracket 64 reaches β3, the inner peripheral surface of the second engaging hole 64b of the release bracket 64 abuts against the protruding portion 61b of the output side inner ring member 61. Accordingly, the rotation of the release bracket 64 can be transmitted to the output side inner ring member 61. Further, as described by referring FIGS. 7A and 7B, the output side inner ring member 61 and the output side outer ring member 62 are already rotatable counterclockwise. Therefore, when the operation lever 21 is further rotated counterclockwise from the state shown in FIGS. 8A and 8B, the output side inner ring member 61 and the output side outer ring member 62 rotate counterclockwise, and the output shaft member 30 spline-coupled to the output side inner ring member 61 rotates counterclockwise. As a result, the height of the seating seat 40a of the vehicle seat 40 is displaced.

<Maximum Rotational State>

Figure 9A:
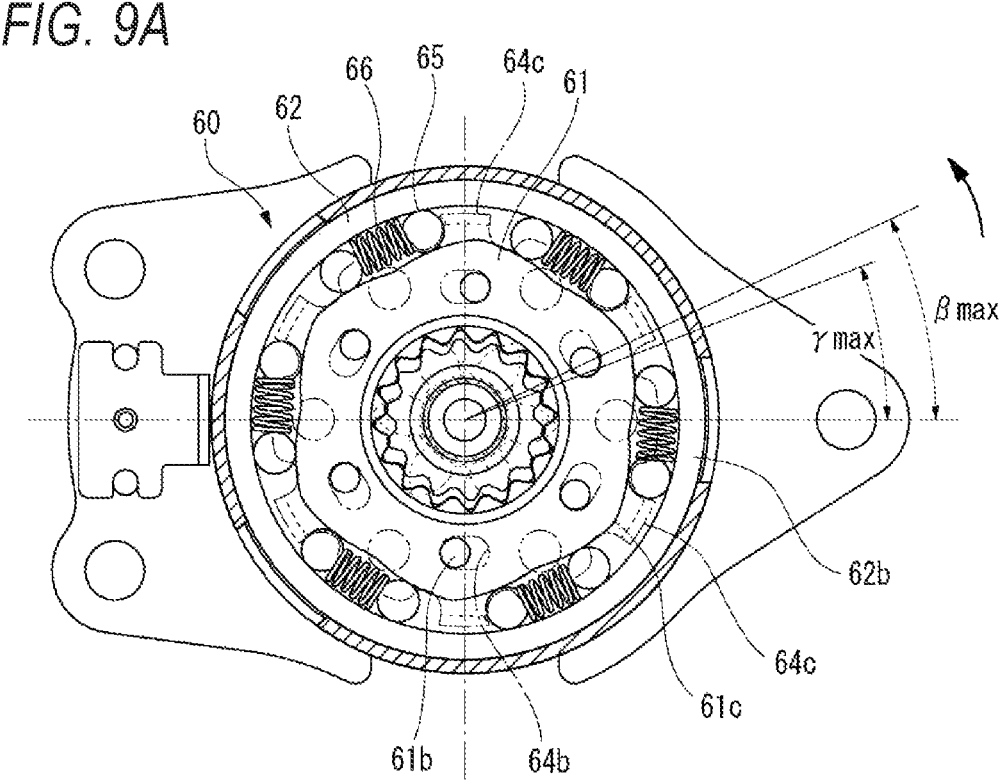
FIG. 9A is a view that illustrates the internal operation of the clutch unit for a vehicle and is a sectional view taken along the line B-B in FIG. 3.
Figure 9B:
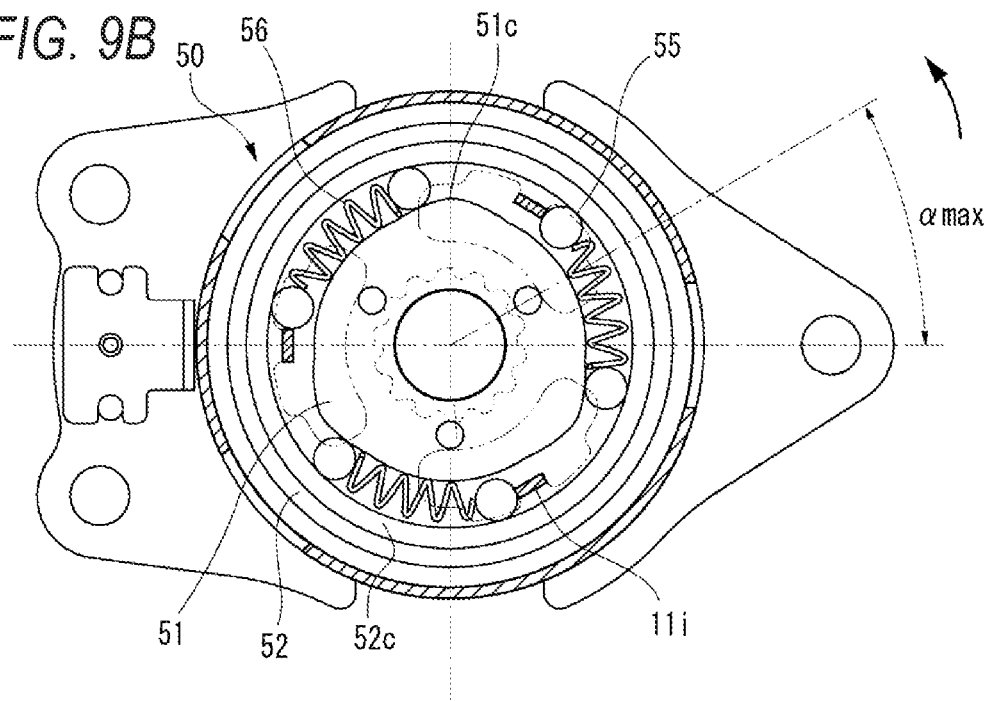
FIG. 9B is a view that illustrates the internal operation of the clutch unit for a vehicle and is a sectional view taken along the line C-C in FIG. 3.

FIGS. 9A and 9B are views showing a state in which the operation lever 21 is rotated counterclockwise to the maximum operation angle αmax. FIG. 9A shows the output side clutch 60, and FIG. 9B shows the input side clutch 50.

When the operation lever 21 is rotated to be reached to the maximum operation angle αmax, the clutch unit 100 for a vehicle is in the maximum rotational state. In this state, the regulating piece portion 22e of the operation plate 22 abuts against the free end portion 23a abutting against the spring locking piece 24a, and the rotation of the operation lever 21 is regulated (see FIG. 4B).

In the maximum rotational state, as shown in FIG. 9B, the rotation angle α of the input side inner ring member 51 and the input side outer ring member 52 in the counterclockwise direction is also the maximum rotation angle αmax. As shown in FIG. 9A, the rotation angle of the release bracket 64 in the counterclockwise direction becomes the maximum rotation angle βmax. Then, a rotation angle γ of the output side inner ring member 61 rotated together with the release bracket 64 in the counterclockwise direction is the maximum rotation angle γmax.

<Return to Neutral State>

When one rotation operation by the operation lever 21 is completed and the rotational force applied to the operation lever 21 by the operator is released, the return force of the bent return spring 23 causes the operation lever 21 to rotate clockwise toward an initial neutral position. Then, in the input side clutch 50, the operation lever 21 is rotated clockwise, whereby the input side inner ring member 51 is rotated clockwise via the operation plate 22 and the operation bracket 54.

When the rotation angle of the input side inner ring member 51 is larger than the rotation angle α1 shown in FIG. 6B (the state shown in FIGS. 7A to 9B), the protruding piece 11i of the housing 11 abuts against the input side clutch roller 55a adjacent to the protruding piece 11i of the housing 11 in the clockwise direction, and presses the input side clutch roller 55a in the clockwise direction. As a result, the biting of the input side clutch roller 55a into the wedge cam portion 51c and the outer ring portion 52c is released. When the input side inner ring member 51 attempts to rotate clockwise from this state, the input side clutch roller 55a cannot transmit the clockwise rotation of the input side inner ring member 51 to the input side outer ring member 52.

Therefore, in a state in which the rotation angle of the input side inner ring member 51 is larger than the rotation angle α1 shown in FIG. 6B (the state shown in FIGS. 7A to 9B), the input side inner ring member 51 idles with respect to the input side outer ring member 52, only the input side inner ring member 51 rotates clockwise, and the input side outer ring member 52 does not rotate. Accordingly, when the operation lever 21 is returned to the neutral position, only the input side inner ring member 51 is returned to the neutral position (see FIG. 5B) together with the operation lever 21, and in the output side clutch 60, the release bracket 64 is not rotated. As a result, the output shaft member 30 is in a state in which a rotational phase is maintained (see FIG. 9A).

As described above, in the clutch unit 100 for a vehicle described above, during a driving operation in which the operation lever 21 is driven from the neutral position, the input side inner ring member 51 rotates with the rotation of the operation lever 21, and the input side outer ring member 52 is rotated via the input side clutch roller 55, thereby the input side clutch 50 transmits the rotation of the operation lever 21 to the output side clutch 60. Further, during a return operation to return to the neutral position after operating the operation lever 21, the operation lever 21 is returned to the neutral position while holding a rotational position of the output shaft member 30. The output side clutch 60 regulates the rotation of the output shaft member 30 due to a force input on the output shaft member 30 from the vehicle seat 40 side.

<Co-Rotation>

Figure 10A:
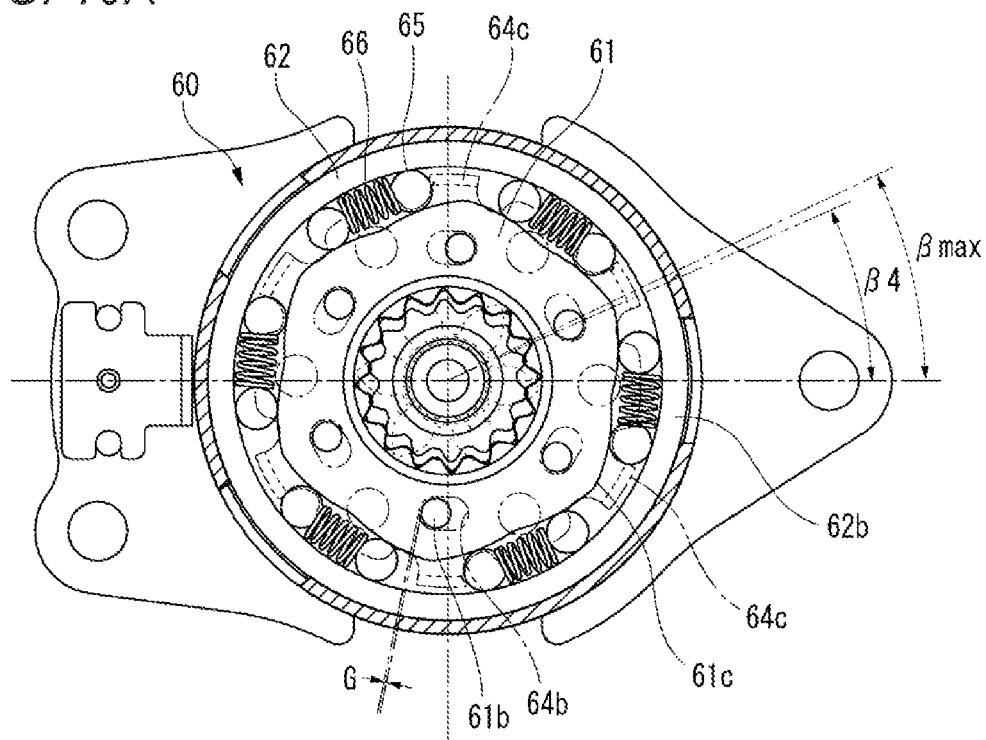
FIG. 10A is a view that illustrates an internal operation of a clutch unit for a vehicle according to a reference example and is a sectional view taken along the line B-B in FIG. 3.
Figure 10B:
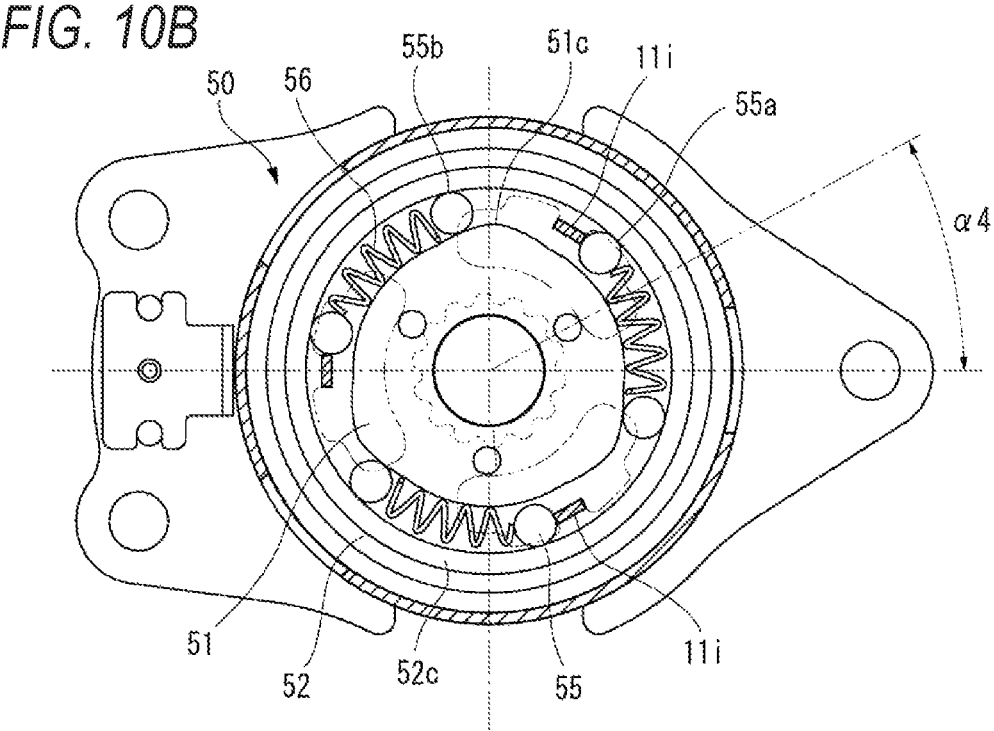
FIG. 10B is a view that illustrates the internal operation of the clutch unit for a vehicle according to the reference example and is a sectional view taken along the line C-C in FIG. 3.
Figure 11A:
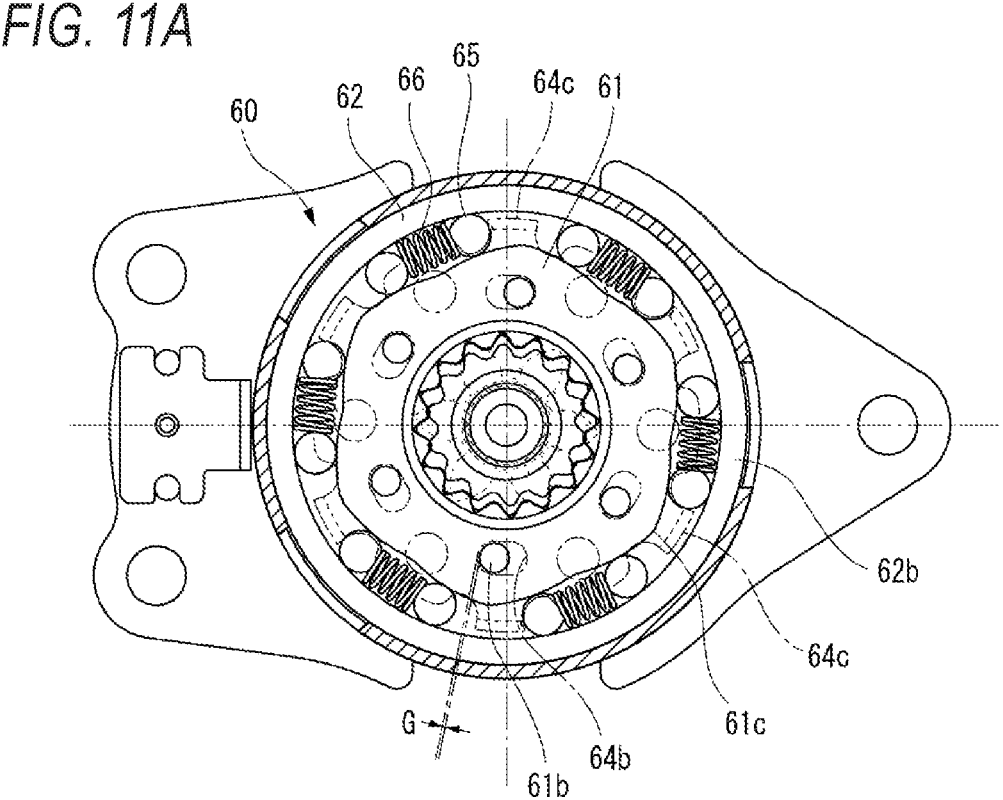
FIG. 11A is a view that illustrates the internal operation of the clutch unit for a vehicle according to the reference example and is a sectional view taken along the line B-B in FIG. 3.
Figure 11B:
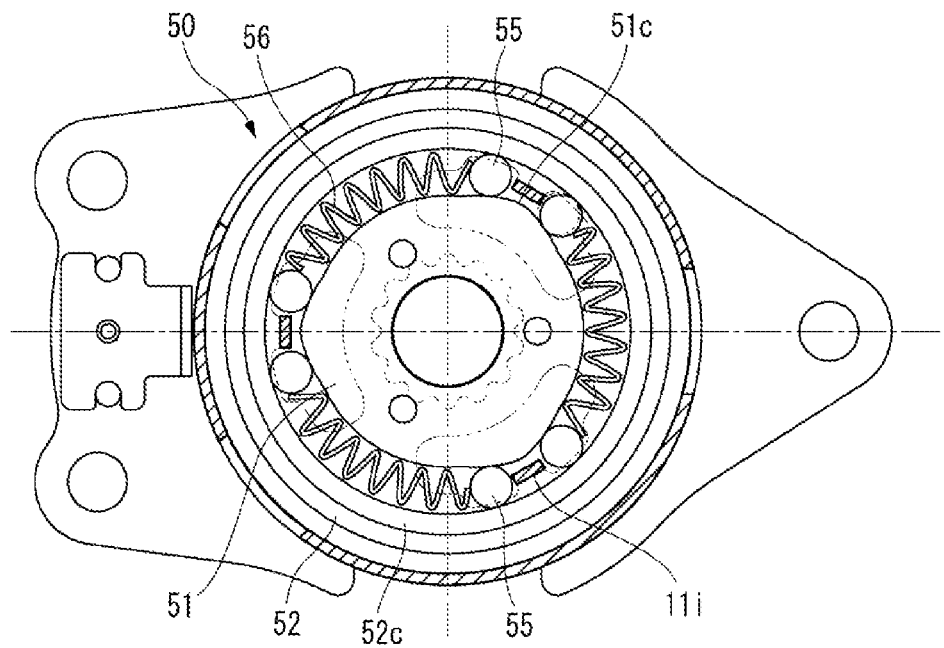
FIG. 11B is a view that illustrates the internal operation of the clutch unit for a vehicle according to the reference example and is a sectional view taken along the line C-C in FIG. 3.

Here, the co-rotation of the input side outer ring member 52 will be described with reference to FIGS. 10A, 10B, 11A and 11B. FIGS. 10A, 10B, 11A and 11B show a state of returning to the neutral position in a clutch unit for a vehicle that operates as described above and does not include the rotation suppressing member 53. FIGS. 10A and 10B show a state of starting to return from the maximum rotational state (FIGS. 9A and 9B), and FIGS. 11A and 11B show a state in which the operation lever 21 has returned to the neutral state.

As described above, when the operation lever 21 returns to the neutral position after the counterclockwise rotation operation by the operation lever 21, in the input side clutch 50, the operation lever 21 is rotated clockwise, and the input side inner ring member 51 is rotated clockwise via the operation plate 22 and the operation bracket 54. FIGS. 10A and 10B show a state immediately after the operation lever 21 is released from the maximum rotation state, and show a state in which the rotation angle of the input side inner ring member 51 is α4 slightly smaller than the maximum rotation angle αmax.

At this time, as shown in FIG. 10B, in the input side clutch 50, the input side clutch roller 55a positioned in the clockwise direction relative to the protruding piece 11i of the housing 11 is in a state where the biting into the input side inner ring member 51 and the input side outer ring member 52 is released. However, the input side clutch roller 55b positioned in the counterclockwise direction relative to the protruding piece 11i of the housing 11 is pressed by the input side roller urging spring 56 and remains in a state of being bitten into the input side inner ring member 51 and the input side outer ring member 52.

As described above, in the state in which the input side clutch roller 55b is pressed by the input side roller urging spring 56, a frictional force acts between the input side clutch roller 55b and the input side inner ring member 51 and between the input side clutch roller 55b and the input side outer ring member 52. This frictional force continues to act until the input side roller urging spring 56 returns to a natural length thereof and the input side clutch roller 55b is no longer pressed by the input side roller urging spring 56. As a result, it is desired to rotate only the input side inner ring member 51 without rotating the input side outer ring member 52 during the return operation of the operation lever 21, the rotation in the clockwise direction of the input side inner ring member 51 is transmitted to the input side outer ring member 52 via the input side clutch roller 55b.

Then, the unintended clockwise rotation (co-rotation) of the input side outer ring member 52 is transmitted to the release bracket 64 spline-coupled thereto. As a result, as shown in FIG. 10A, the rotation angle of the release bracket 64 in the counterclockwise direction is β4 slightly smaller than the maximum rotation angle βmax. With the unintended rotation of the input side outer ring member 52, a minute gap G is formed between the inner peripheral surface of the second engaging hole 64b and the protruding portion 61b from the state in which the inner peripheral surface of the second engaging hole 64b of the release bracket 64 abuts against the protruding portion 61b of the output side inner ring member 61.

Thereafter, even when the operation lever 21 is returned to the neutral position and the input side inner ring member 51 is returned to the neutral position as shown in FIG. 11B, the release bracket 64 remains displaced clockwise by an amount of the gap G as shown in FIG. 11A.

As a result, when the operation lever 21 is rotated counterclockwise again in order to rotate the output shaft member 30 counterclockwise again from the state of FIGS. 11A and 11B, a timing at which the rotation of the release bracket 64 is transmitted to the output side inner ring member 61 is delayed by the amount of the gap G formed between the inner peripheral surface of the second engaging hole 64b and the protruding portion 61b, and responsiveness is impaired.

Therefore, in the clutch unit 100 for a vehicle according to the present embodiment, as shown in FIGS. 2 and 3, the rotation suppressing member 53 is provided between the input side outer ring member 52 of the input side clutch 50 and the operation bracket 54. The rotation suppressing member 53 applies a rotational resistance force greater than a force for co-rotating the input side outer ring member 52 between the input side outer ring member 52 and the housing 11 that does not rotate during the return operation of the operation lever 21 so as to suppress the co-rotation of the input side outer ring member 52 by the input side inner ring member 51 during the return operation of the operation lever 21 to the neutral position. In the present embodiment, the rotation suppressing member 53 urges the input side outer ring member 52 and the operation bracket 54 in a direction away from each other in the rotation axis direction.

The rotation suppressing member 53 urges the input side outer ring member 52 toward the output side in the axial direction. On the other hand, the rotation suppressing member 53 urges the operation bracket 54 toward the input side in the axial direction. Therefore, the input side outer ring member 52 is less likely to receive an axial force from the operation bracket 54 to the output side. That is, the input side outer ring member 52 is easily maintained in a posture by the rotation suppressing member 53 regardless of a rotational movement of the operation bracket 54.

The input side outer ring member 52 is pressed against the release bracket 64 by the rotation suppressing member 53, and a frictional force acts between the input side outer ring member 52 and the release bracket 64 to prevent a relative rotation between them. Therefore, the input side outer ring member 52 is made difficult to rotate due to the rotation of the input side inner ring member 51 or the operation bracket 54.

In this way, the rotation suppressing member 53 can apply a rotational resistance force larger than a force for co-rotating between the input side outer ring member and the operation bracket 54, and can suppress the co-rotation.

Further, since the rotation suppressing member 53 presses the operation bracket 54 against the bottom surface 11a of the housing 11, the operation bracket 54 does not easily rattle when the operation lever 21 is rotated.

Therefore, according to the clutch unit 100 for a vehicle according to the present embodiment, it is possible to suppress rattling of the operation lever 21 without increasing the number of components, and to suppress the co-rotation of the input side outer ring member 52 or the input side inner ring member 51.

According to the clutch unit 100 for a vehicle according to the present embodiment, the release bracket 64 (pressing force transmission portion) transmits, to the output side clutch roller 65, the force that the rotation suppressing member 53 urges in the rotation axis direction. By pressing the output side clutch roller 65 in the axial direction by the release bracket 64, it is possible to suppress a vibration of the output side clutch roller 65 in the axial direction. Therefore, it is possible to suppress generation of an abnormal noise caused by the axial vibration of the output side clutch roller 65.

According to the clutch unit 100 for a vehicle, it is possible to suppress the generation of an abnormal noise caused by the vibration of the output side clutch roller 65 without increasing the number of components, while suppressing the co-rotation between the input side inner ring member 51 and the input side outer ring member 52 when the operation lever 21 returns to the neutral position. Therefore, according to the clutch unit 100 for a vehicle of the present embodiment, the rattling of the operation lever 21 is suppressed, and the rattling of the output side clutch roller 65 is also suppressed.

The outer diameter of the release bracket (pressing force transmission portion) 64 is formed to be larger than the outer diameter of the output side inner ring member 61 and smaller than the inner diameter of the output side outer ring member 62. Therefore, since the output side outer ring member 62 and the release bracket 64 do not slide in contact with each other in the radial direction, an operation of the clutch unit 100 for a vehicle can be made smooth.

The rotation suppressing member 53 that urges the operation bracket 54 toward the input side in the axial direction toward the bottom surface 11a of the housing 11 is provided, and the second urging member 25 that urges the operation plate 22 to which the operation bracket 54 is connected toward the output side in the axial direction toward the bottom surface 11a of the housing 11 is provided. Therefore, the force applied to the operation bracket 54 pushed by the rotation suppressing member 53 and pressed against the bottom surface 11a of the housing 11 is reduced by the second urging member 25. As a result, the frictional force generated between the operation bracket 54 and the bottom surface 11a of the housing 11 is reduced, and the operation of the clutch unit 100 for a vehicle can be made smooth.

The rotation suppressing member 53 is arranged in a region where the input side outer ring member 52 and the operation bracket 54 face each other in the rotation axis direction. Therefore, an engagement allowance between the input side outer ring member 52 and the operation bracket 54 can be increased, and an urging force of the rotation suppressing member 53 can be efficiently input to the input side outer ring member 52. In addition, since the rotation suppressing member 53 is positioned between the input side outer ring member 52 and the operation bracket 54, the rotation suppressing member 53 easily presses the input side outer ring member 52 and the operation bracket 54 in a direction in which the input side outer ring member 52 is separated from the operation bracket 54 in the axial direction.

In the embodiment described above, an example in which a wave washer is used as the rotation suppressing member 53 has been described, but the present invention is not limited to thereto. For example, a compression spring capable of suppressing co-rotation and suppressing the rattling of the operation lever 21 may be used.

In the embodiment described above, a configuration in which the input side inner ring member 51 (one member) rotates together with the operation lever 21 has been described, but the present invention is not limited thereto. For example, a configuration in which the input side outer ring member rotates together with the operation lever 21 may be adopted. In this case, the rotation suppressing member 53 is provided between the input side inner ring member and the operation bracket 54 in order to suppress the co-rotation of the input side inner ring member (the other member) by the input side outer ring member one member).

<Modification>

Figure 12:
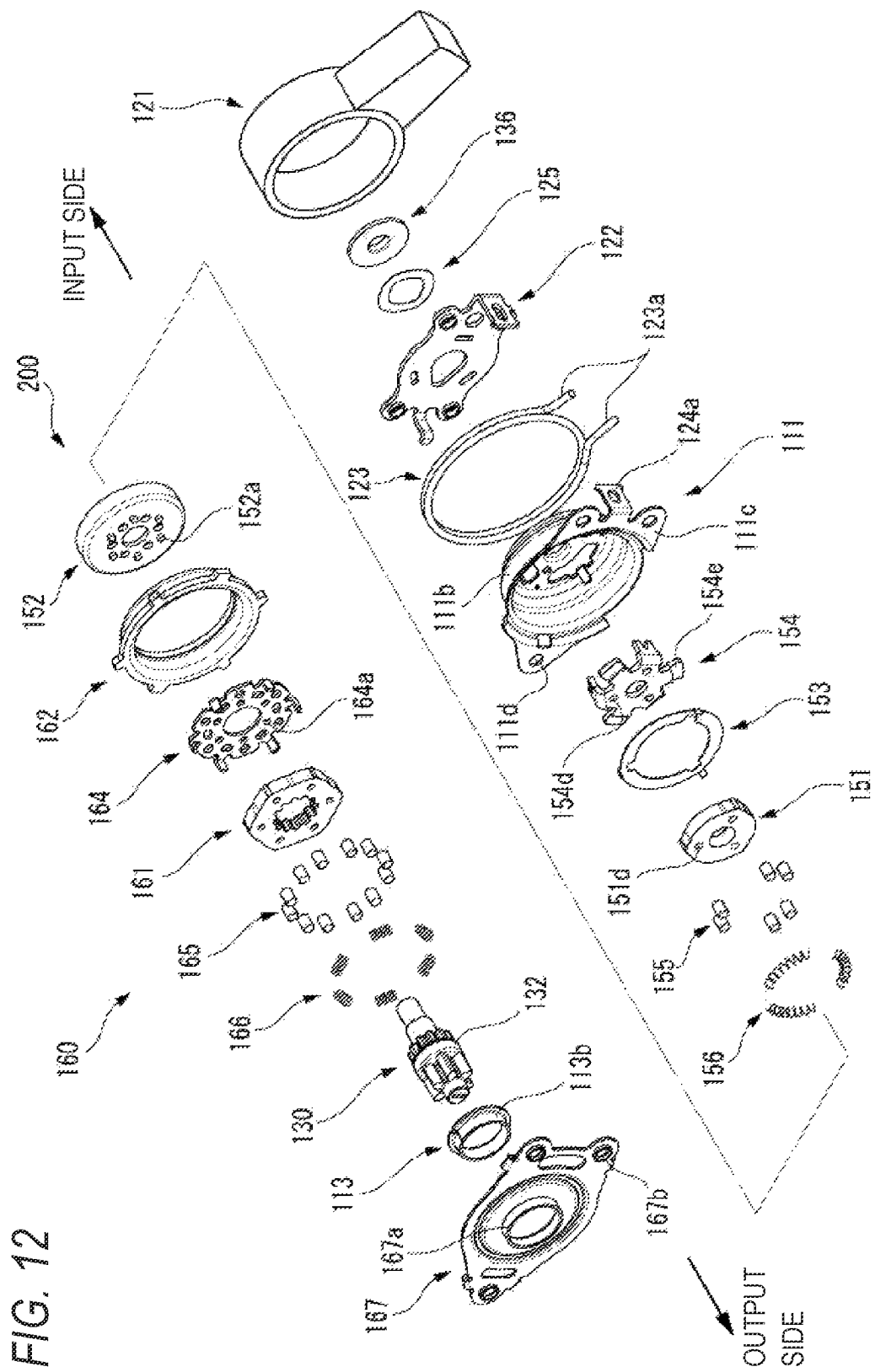
FIG. 12 is an exploded perspective view of a clutch unit for a vehicle according to a modification of the present invention.
Figure 13:
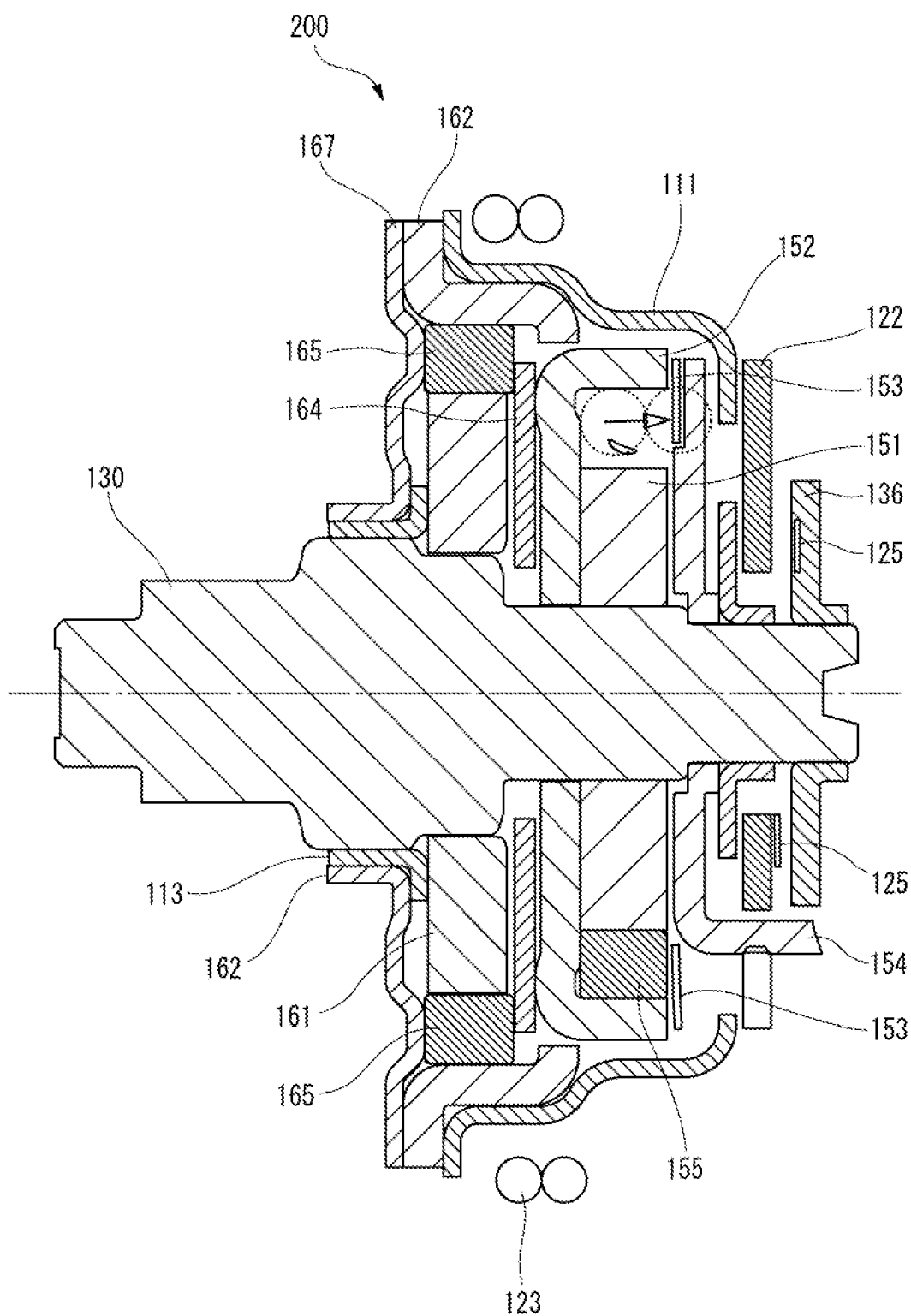
FIG. 13 is a sectional view taken along an axial direction of the clutch unit for a vehicle according to the modification.

FIG. 12 is an exploded perspective view of a clutch unit 200 for a vehicle according to a modification of the present invention. FIG. 13 is a sectional view along the axial direction of the clutch unit 200 for a vehicle according to the modification of the present invention. The reference numerals indicating constituent members of the clutch unit 200 for a vehicle according to the modification are indicated by the reference numerals indicating the respective constituent members of the clutch unit 100 for a vehicle according to the above-described embodiment plus 100.

As shown in FIGS. 12 and 13, also in the clutch unit 200 for a vehicle according to the present modification, a rotation suppressing member 153 is provided between an input side outer ring member 152 and an operation bracket 154 in the rotation axis direction, and the input side outer ring member 152 and the operation bracket 154 are separated from each other by an urging force of the rotation suppressing member 153.

Similarly to the embodiment described above, the release bracket 164 transmits the urging force of the rotation suppressing member 153 to the output side clutch roller 165. As a result, the generation of an abnormal noise caused by the axial vibration of the output side clutch roller 165 is suppressed.

In the present modification, a spring locking piece 124a is provided on a fixing flange 111c of a housing 111. The spring locking piece 124a extends to the input side in the axial direction along a tubular portion 111b of the housing 111. The spring locking piece 124a is arranged between both free end portions 123a of a return spring 123.

In the present modification, the operation bracket 154 includes three convex portions 154d protruding toward the input side inner ring member 151. The input side inner ring member 151 includes three concave portions 151d into which the convex portions 154d of the operation bracket 154 are inserted. By these fitting structure of the convex portions 154d and the concave portions 151d, the operation bracket 154 and the input side inner ring member 151 are connected so as to rotate integrally with each other and so as to be relatively movable in the rotation axis direction.

The operation bracket 154 includes three enlarged diameter portions 154e. The enlarged diameter portion 154e has an outer diameter larger than an outer diameter of the rotation suppressing member 153. The rotation suppressing member 153 abuts against the enlarged diameter portion 154e to apply an axial force.

In the present modification, the input side outer ring member 152 includes a plurality of protrusions 152a having diameters equal to each other. The release bracket 164 includes a plurality of hole portions 164a. The input side outer ring member 152 and the release bracket 164 are engaged by an engagement structure of the protrusion 152a and the hole portion 164a. Accordingly, the release bracket 164 is rotatable together with the input side outer ring member 152.

In the present modification, a fixing member 167 is provided on a side of the output side clutch roller 165 opposite to the release bracket (pressing force transmission portion) 164 in the rotation axis direction. The fixing member 167 is a substantially plate-shaped member. The fixing member 167 is provided coaxially with a rotation shaft of an output shaft member 130 and is rotatable relative to the output shaft member 130. An inner peripheral surface of an inner hole of the fixing member 167 rotatably supports a large-diameter cylindrical portion 132 of the output shaft member 130 via a cylindrical portion 113b of a metal bush 113.

The fixing member 167 is provided with a cylindrical portion 167a extending toward the output side in the axial direction at a center portion thereof, and is provided with three fixing bolt insertion holes 167b in an outer edge portion thereof. The fixing member 167 is fixed to the seat frame 40c together with the housing 111 by screwing bolts (not shown) inserted into the fixing bolt insertion holes 167*b* and fixing bolt insertion holes 111*d* of the housing 111 into screw holes of the seat frame 40*c*.

In the present modification, the output side outer ring member 162 is accommodated in the housing 111 and fixed to the housing 111 by fixing the fixing member 167 to the seat frame 40*c* together with the housing 111.

According to the present modification, the fixing member 167 is provided on the side of the output side clutch roller 165 opposite to the release bracket (pressing force transmission portion) 164 in the rotation axis direction. By urging the output side clutch roller 165 from the release bracket 164 in the rotation axis direction, the fixing member 167 is pressed against the output side clutch roller 165. Therefore, the output side clutch roller 165 is sandwiched between the release bracket 164 and the fixing member 167, and the force in the rotation axis direction by the rotation suppressing member 153 acts on the output side clutch roller 165. Therefore, even when a vibration is applied to the clutch unit 200 for a vehicle, the output side clutch roller 165 is unlikely to vibrate and an abnormal noise is unlikely to occur.

According to the present modification, a gap is provided between the input side outer ring member 152 and the output side inner ring member 161. Therefore, the output side inner ring member 161 is not urged from the release bracket 164 in the rotation axis direction. Since the output side inner ring member 161 is not pressed against the fixing member 167, the operation of the clutch unit 100 for a vehicle can be made smooth.

The rotation suppressing member 153 may be provided between the release bracket 164 and the input side outer ring member 152. The rotation suppressing member 153 urges the output side clutch roller 165 to the fixing member 167 via the release bracket 164, thereby it is possible to suppress the vibration of the output side clutch roller 165 in the rotational axis direction.

The release bracket 164 and the input side outer ring member 152 may be integrally formed.

The present application is based on a Japanese Patent Application No. 2018-104581 filed May 31, 2018, the contents of which are incorporated herein by way of reference.

INDUSTRIAL APPLICABILITY

According to the present invention, it is possible to provide the clutch unit for a vehicle in which an abnormal noise caused by the vibration of an output side transmission member is unlikely to occur.

REFERENCE SIGNS LIST

11 housing
11*a* bottom surface
21 operation lever
22 operation plate
25 second urging member
30 output shaft member
50 input side clutch
51 input side inner ring member
52 input side outer ring member
53 rotation suppressing member
54 operation bracket (operation member)
55 input side clutch roller (input side transmission member)
56 input side roller urging spring
60 output side clutch
61 output side inner ring member
62 output side outer ring member
64 release bracket (pressing force transmission portion)
65 output side clutch roller (output side transmission member)
66 output side roller urging spring
100 clutch unit for a vehicle
111 housing
111*a* bottom surface
121 operation lever
122 operation plate
130 output shaft member
150 input side clutch
151 input side inner ring member
152 input side outer ring member
153 rotation suppressing member
154 operation bracket (operation member)
155 input side clutch roller (input side transmission member)
156 input side roller urging spring
160 output side clutch
161 output side inner ring member
162 output side outer ring member
164 release bracket (pressing force transmission portion)
165 output side clutch roller (output side transmission member)
167 fixing member
200 clutch unit for a vehicle

The invention claimed is:

1. A clutch unit used for a vehicle seat, comprising:
an operation lever rotatable around a rotation axis and capable of returning to a neutral position;
an output shaft member rotatable around the rotation axis and configured to output an operating force input on the operation lever to the vehicle seat;
an input side clutch including an input side inner ring member and an input side outer ring member which are coaxial with the rotation axis and into which the output shaft member, and an input side transmission member which is arranged between an outer peripheral surface of the input side inner ring member and an inner peripheral surface of the input side outer ring member; and
an output side clutch including an output side inner ring member and an output side outer ring member which are provided coaxially with the rotation axis, an output side transmission member arranged between an outer peripheral surface of the output side inner ring member and an inner peripheral surface of the output side outer ring member, wherein
the input side clutch is configured such that
one member of the input side inner ring member and the input side outer ring member rotates with a rotation of the operation lever, and the other member of the input side inner ring member and the input side outer ring member is rotated via the input side transmission member, so that the rotation of the operation lever is transmitted to the output side clutch,
during a driving operation of driving the operation lever from the neutral position, the rotation of the operation lever is input to the output side clutch, and
during a return operation to return to the neutral position after driving the operation lever, the operation lever is returned to the neutral position while holding a rotational position of the output shaft member, the output side clutch is configured to allow a rotation of the output shaft member when the rotation of the operation lever is transmitted by the other member of the input side clutch while regulating the rotation of the output shaft member due to a force input from a vehicle seat side to the output shaft member, so as to suppress co-rotation of the other member by the one member during the return operation of the operation lever to the neutral position, a ring-shaped spring steel configured to urge the other member in the rotation axis direction and apply a rotational resistance force greater than a force for the co-rotating is provided, and a release bracket configured to transmit a force the ring-shaped spring steel urges in the rotation axis direction to the output side transmission member is provided.

2. The clutch unit for a vehicle according to claim 1, wherein a fixing member is provided on a side of the output side transmission member opposite to the release bracket in the rotation axis direction, and the fixing member is pressed against the output side transmission member by urging the output side transmission member in the rotation axis direction.

3. The clutch unit for a vehicle according to claim 1, wherein a gap is provided between the other member and the output side inner ring member in the rotation axis direction.

4. The clutch unit for a vehicle according to claim 1, wherein an outer diameter of the release bracket is larger than an outer diameter of the output side inner ring member and smaller than an inner diameter of the output side outer ring member.

* * * * *